US012603724B2

(12) United States Patent
Abotabl et al.

(10) Patent No.: US 12,603,724 B2
(45) Date of Patent: Apr. 14, 2026

(54) ADAPTABLE RESOURCE ALLOCATION LENGTH

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 682 days.

(21) Appl. No.: 17/930,256

(22) Filed: Sep. 7, 2022

(65) Prior Publication Data

US 2024/0080128 A1 Mar. 7, 2024

(51) Int. Cl.
| | |
|---|---|
| *H04W 4/00* | (2018.01) |
| *H04L 1/00* | (2006.01) |
| *H04L 5/14* | (2006.01) |
| *H04W 72/0446* | (2023.01) |
| *H04W 72/0453* | (2023.01) |

(52) U.S. Cl.
CPC ............. *H04L 1/0007* (2013.01); *H04L 5/14* (2013.01); *H04W 72/0446* (2013.01); *H04W 72/0453* (2013.01)

(58) Field of Classification Search
None
See application file for complete search history.

(56) References Cited

U.S. PATENT DOCUMENTS

| | | | | |
|---|---|---|---|---|
| 11,956,043 | B2 * | 4/2024 | Park | H04B 7/024 |
| 2019/0253200 | A1 * | 8/2019 | Salem | H04W 74/0808 |
| 2020/0022144 | A1 * | 1/2020 | Papasakellariou | .... H04L 5/0053 |
| 2020/0067676 | A1 * | 2/2020 | Yi | H04W 72/23 |
| 2020/0120680 | A1 * | 4/2020 | Hwang | H04L 1/00 |
| 2020/0221429 | A1 * | 7/2020 | Li | H04W 72/23 |
| 2020/0267511 | A1 * | 8/2020 | Abdoli | H04L 5/001 |
| 2021/0212071 | A1 * | 7/2021 | Liu | H04W 72/53 |
| 2021/0235487 | A1 * | 7/2021 | Park | H04L 1/0068 |
| 2021/0235496 | A1 * | 7/2021 | Park | H04B 1/715 |

(Continued)

FOREIGN PATENT DOCUMENTS

WO WO-2021242931 A1 12/2021

OTHER PUBLICATIONS

International Search Report and Written Opinion—PCT/US2023/073522—ISA/EPO—Jan. 8, 2024 (2205381WO).

*Primary Examiner* — Bob A Phunkulh
(74) *Attorney, Agent, or Firm* — Paul M. McAdams; NORTON ROSE FULBRIGHT US LLP

(57) ABSTRACT

This disclosure provides systems, methods, and devices for wireless communication that support enhanced frequency domain resource allocation. In a first aspect, an apparatus includes at least one processor and a memory coupled to the at least one processor. The at least one processor is configured to receive resource allocation information including a quantity of bits that corresponds to a transmission bandwidth for a transmission; and communicate, based on the quantity of bits, with a second network node using the transmission bandwidth for the transmission. Other aspects and features are also claimed and described.

7 Claims, 16 Drawing Sheets

(56) References Cited

U.S. PATENT DOCUMENTS

| | | | | |
|---|---|---|---|---|
| 2022/0053523 | A1* | 2/2022 | Jia | H04W 72/0453 |
| 2022/0095304 | A1* | 3/2022 | Muruganathan | H04B 7/024 |
| 2022/0159686 | A1* | 5/2022 | Shin | H04L 5/0094 |
| 2022/0272730 | A1* | 8/2022 | Li | H04W 74/0808 |
| 2022/0312462 | A1* | 9/2022 | He | H04W 72/23 |
| 2022/0312464 | A1* | 9/2022 | He | H04W 72/23 |
| 2022/0361202 | A1* | 11/2022 | Yi | H04W 24/10 |
| 2022/0394741 | A1* | 12/2022 | Jiang | H04W 72/1268 |
| 2023/0016937 | A1* | 1/2023 | Jang | H04B 7/0695 |
| 2023/0067551 | A1* | 3/2023 | Wu | H04W 72/0453 |
| 2023/0072342 | A1* | 3/2023 | Wang | H04W 72/23 |
| 2023/0073001 | A1* | 3/2023 | He | H04W 56/0015 |
| 2023/0139455 | A1* | 5/2023 | Chatterjee | H04W 72/23 |
| | | | | 370/329 |
| 2023/0239846 | A1* | 7/2023 | Sun | H04L 5/0007 |
| 2023/0388092 | A1* | 11/2023 | Lei | H04L 5/0053 |
| 2024/0380563 | A1* | 11/2024 | Shim | H04L 5/0094 |
| 2024/0414700 | A1* | 12/2024 | Lei | H04W 72/232 |
| 2024/0421864 | A1* | 12/2024 | Nilsson | H04B 7/0639 |
| 2025/0008515 | A1* | 1/2025 | Ghanbarinejad | H04W 88/08 |
| 2025/0056540 | A1* | 2/2025 | Deghel | H04J 11/0053 |
| 2025/0192965 | A1* | 6/2025 | Jan | H04L 5/0032 |

* cited by examiner

300

350

DL
GB
UL

Frequency

Time

Sub-band Full Duplex

340

DL
UL

Frequency

Time

In-band Full Duplex
(partial overlap)

330

DL
UL

Frequency

Time

In-band Full Duplex
(full overlap)

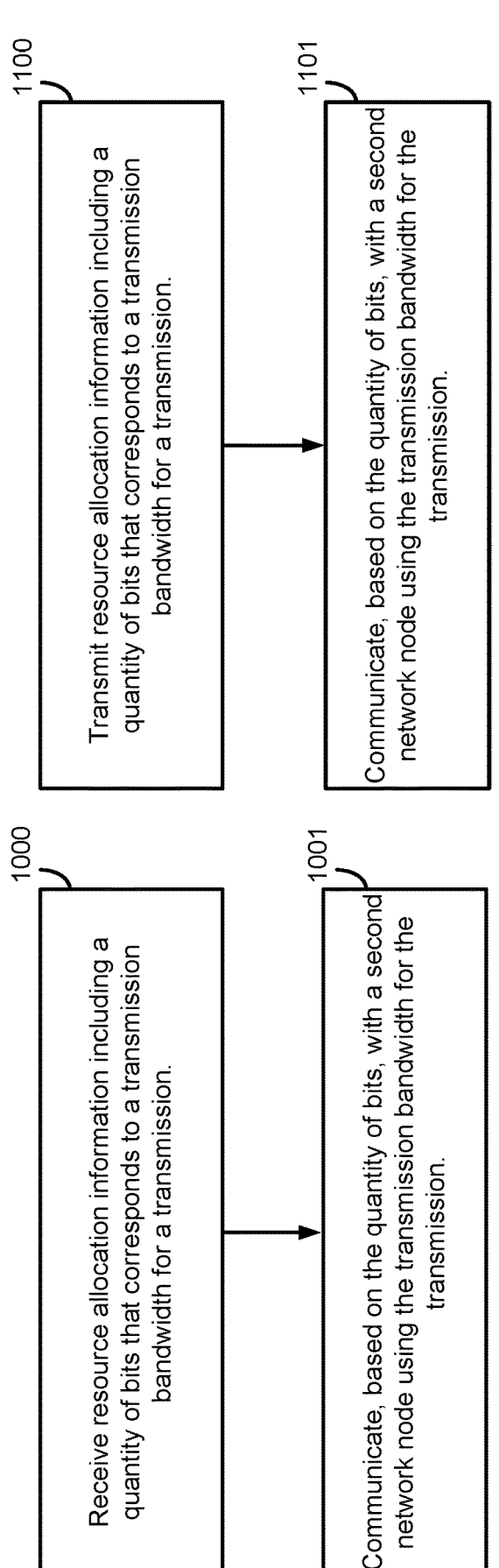

1100

Transmit resource allocation information including a quantity of bits that corresponds to a transmission bandwidth for a transmission.

1101

Communicate, based on the quantity of bits, with a second network node using the transmission bandwidth for the transmission.

Receive resource allocation information including a quantity of bits that corresponds to a transmission bandwidth for a transmission.

1001

Communicate, based on the quantity of bits, with a second network node using the transmission bandwidth for the transmission.

*FIG. 10*

ADAPTABLE RESOURCE ALLOCATION LENGTH

TECHNICAL FIELD

Aspects of the present disclosure relate generally to wireless communication systems, and more particularly, to enhanced frequency domain resource allocation. Some features may enable and provide improved communications, including variable length bitmap for frequency domain resource allocation.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks may be multiple access networks that support communications for multiple users by sharing the available network resources.

A wireless communication network may include several components. These components may include wireless communication devices, such as base stations (or node Bs) that may support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on a downlink to a UE or may receive data and control information on an uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, an apparatus includes at least one processor and a memory coupled to the at least one processor. The at least one processor is configured to receive resource allocation information including a quantity of bits that corresponds to a transmission bandwidth for a transmission; and communicate, based on the quantity of bits, with a second network node using the transmission bandwidth for the transmission.

In an additional aspect of the disclosure, a method for wireless communication includes receiving resource allocation information including a quantity of bits that corresponds to a transmission bandwidth for a transmission; and communicating, based on the quantity of bits, with a second network node using the transmission bandwidth for the transmission.

In an additional aspect of the disclosure, an apparatus includes means for receiving resource allocation information including a quantity of bits that corresponds to a transmission bandwidth for a transmission; and means for communicating, based on the quantity of bits, with a second network node using the transmission bandwidth for the transmission.

In an additional aspect of the disclosure, a non-transitory computer-readable medium stores instructions that, when executed by a processor, cause the processor to perform operations. The operations include receiving resource allocation information including a quantity of bits that corresponds to a transmission bandwidth for a transmission; and communicating, based on the quantity of bits, with a second network node using the transmission bandwidth for the transmission.

In another aspect of the disclosure, an apparatus includes at least one processor and a memory coupled to the at least one processor. The at least one processor is configured to receive resource allocation information including a quantity of bits that corresponds to a transmission bandwidth for a transmission; and communicate, based on the quantity of bits, with a second network node using the transmission bandwidth for the transmission.

In an additional aspect of the disclosure, a method for wireless communication includes transmitting resource allocation information including a quantity of bits that corresponds to a transmission bandwidth for a transmission; and communicating, based on the quantity of bits, with a second network node using the transmission bandwidth for the transmission.

In an additional aspect of the disclosure, an apparatus includes means for transmitting resource allocation information including a quantity of bits that corresponds to a transmission bandwidth for a transmission; and means for communicating, based on the quantity of bits, with a second network node using the transmission bandwidth for the transmission.

In an additional aspect of the disclosure, a non-transitory computer-readable medium stores instructions that, when executed by a processor, cause the processor to perform operations. The operations include transmitting resource allocation information including a quantity of bits that corresponds to a transmission bandwidth for a transmission; and communicating, based on the quantity of bits, with a second network node using the transmission bandwidth for the transmission.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 9A and 9B are slot diagrams illustrating an example resource allocation according to one or more aspects.

FIG. 10 is a flow diagram illustrating an example process that supports enhanced frequency domain resource allocation according to one or more aspects.

FIG. 11 is a flow diagram illustrating an example process that supports enhanced frequency domain resource allocation according to one or more aspects.

Like reference numbers and designations in the various drawings indicate like elements.

DETAILED DESCRIPTION

Figure 1:
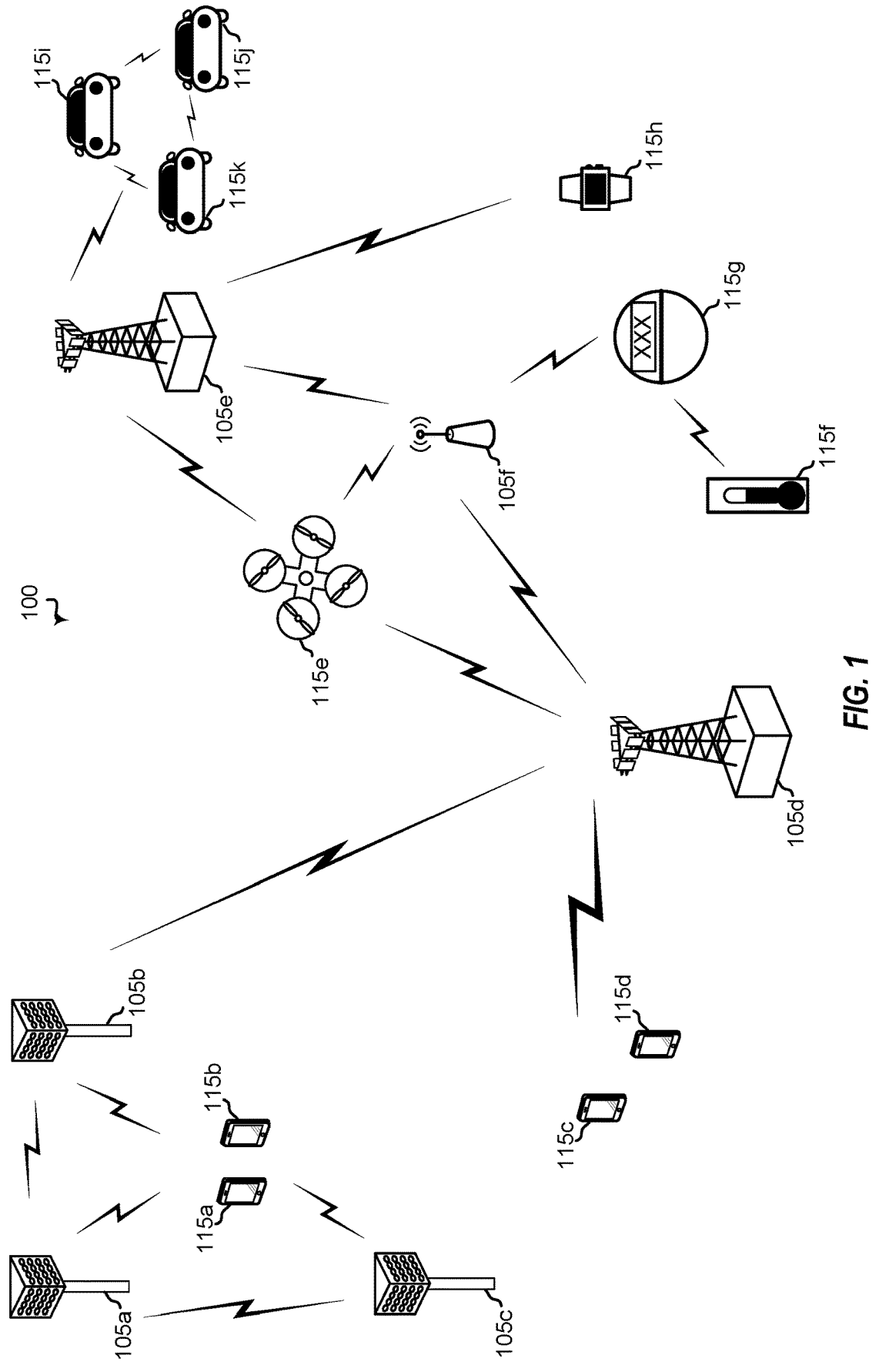
FIG. 1 is a block diagram illustrating details of an example wireless communication system according to one or more aspects.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wide-band-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The 3rd Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. Additionally, an operator network may also include one or more LTE networks, or one or more other networks. The various different network types may use different radio access technologies (RATs) and RANs.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP LTE is a 3GPP project which was aimed at improving UMTS mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Additionally, one or more aspects of the present disclosure may be related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km²), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km²), extreme data rates (e.g., multi-Gbps rate, 100+ Mbps user experienced rates), and deep awareness with advanced discovery and optimizations.

Devices, networks, and systems may be configured to communicate via one or more portions of the electromagnetic spectrum. The electromagnetic spectrum is often subdivided, based on frequency or wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" (mmWave) band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) design or frequency division duplex (FDD) design; and advanced wireless technologies, such as massive multiple input, multiple output (MIMO), robust mmWave transmissions, advanced channel coding, and device-centric mobility. Scalability of the numerology in 5G NR, with scaling of sub-carrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, implementations or uses may come about via integrated chip implementations or other non-module-component based devices (e.g., end-user devices, vehicles, communication devices, computing devices, industrial equipment, retail devices or purchasing devices, medical devices, AI-enabled devices, etc.). While some examples may or may not be specifically directed to use cases or applications, a wide assortment of applicability of described innovations may occur. Implementations may range from chip-level or modular components to non-modular, non-chip-level implementations and further to aggregated, distributed, or original equipment manufacturer (OEM) devices or systems incorporating one or more described aspects. In some practical settings, devices incorporating described aspects and features may also necessarily include additional components and features for implementation and practice of claimed and described aspects. It is intended that innovations described herein may be practiced in a wide variety of implementations, including both large devices or small devices, chip-level components, multi-component systems (e.g., radio frequency (RF)-chain, communication interface, processor), distributed arrangements, end-user devices, etc. of varying sizes, shapes, and constitution.

FIG. 1 is a block diagram illustrating details of an example wireless communication system according to one or more aspects. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" may refer to this particular geographic coverage area of a base station or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as a UE in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component, vehicular device, or vehicular module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an IoT or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115a-115d of the implementation illustrated in FIG. 1 are examples of mobile smart phone-type devices accessing wireless network 100 A UE may also be a machine specifically configured for connected communication, including machine type communication (MTC), enhanced MTC (eMTC), narrowband IoT (NB-IoT) and the like. UEs 115e-115k illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. UEs may operate as base stations or other network nodes in some scenarios. Backhaul communication between base stations of wireless network 100 may occur using wired or wireless communication links.

In operation at wireless network 100, base stations 105a-105c serve UEs 115a and 115b using 3D beamforming and coordinated spatial techniques, such as coordinated multi-point (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

Wireless network 100 of implementations supports mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through wireless network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. Wireless network 100 may also provide additional network efficiency through dynamic, low-latency TDD communications or low-latency FDD communications, such as in a vehicle-to-vehicle (V2V) mesh network between UEs 115i-115k communicating with macro base station 105e.

Figure 2:
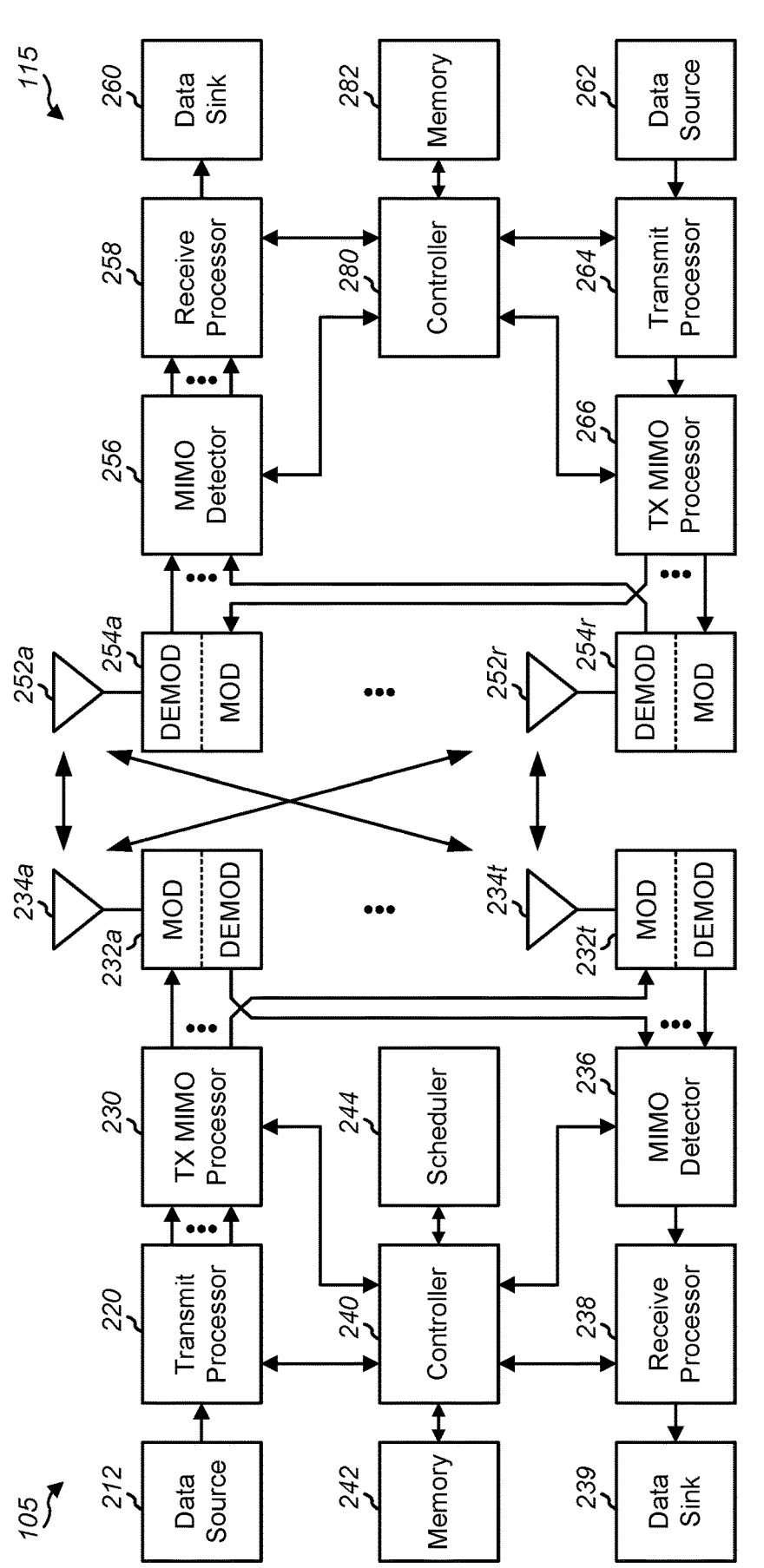
FIG. 2 is a block diagram illustrating examples of a base station and a user equipment (UE) according to one or more aspects.

FIG. 2 is a block diagram illustrating examples of base station 105 and UE 115 according to one or more aspects. Base station 105 and UE 115 may be any of the base stations and one of the UEs in FIG. 1. For a restricted association scenario (as mentioned above), base station 105 may be small cell base station 105f in FIG. 1, and UE 115 may be UE 115c or 115d operating in a service area of base station 105f, which in order to access small cell base station 105f, would be included in a list of accessible UEs for small cell base station 105f. Base station 105 may also be a base station of some other type. As shown in FIG. 2, base station 105 may be equipped with antennas 234a through 234t, and UE 115 may be equipped with antennas 252a through 252r for facilitating wireless communications.

At base station 105, transmit processor 220 may receive data from data source 212 and control information from controller 240, such as a processor. The control information may be for a physical broadcast channel (PBCH), a physical control format indicator channel (PCFICH), a physical hybrid-ARQ (automatic repeat request) indicator channel (PHICH), a physical downlink control channel (PDCCH), an enhanced physical downlink control channel (EPDCCH), an MTC physical downlink control channel (MPDCCH), etc. The data may be for a physical downlink shared channel (PDSCH), etc. Additionally, transmit processor 220 may process (e.g., encode and symbol map) the data and control information to obtain data symbols and control symbols, respectively. Transmit processor 220 may also generate reference symbols, e.g., for the primary synchronization signal (PSS) and secondary synchronization signal (SSS), and cell-specific reference signal. Transmit (TX) MIMO processor 230 may perform spatial processing (e.g., precoding) on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller 280, such as a processor.

On the uplink, at UE 115, transmit processor 264 may receive and process data (e.g., for a physical uplink shared channel (PUSCH)) from data source 262 and control information (e.g., for a physical uplink control channel (PUCCH)) from controller 280. Additionally, transmit processor 264 may also generate reference symbols for a reference signal. The symbols from transmit processor 264 may be precoded by TX MIMO processor 266 if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236 if applicable, and further processed by receive processor 238 to obtain decoded data and control information sent by UE 115. Receive processor 238 may provide the decoded data to data sink 239 and the decoded control information to controller 240.

Controllers 240 and 280 may direct the operation at base station 105 and UE 115, respectively. Controller 240 or other processors and modules at base station 105 or controller 280 or other processors and modules at UE 115 may perform or direct the execution of various processes for the techniques described herein, such as to perform or direct the execution illustrated in FIG. 4, 5, 6, 10, or 11, or other processes for the techniques described herein. Memories 242 and 282 may store data and program codes for base station 105 and UE 115, respectively. Scheduler 244 may schedule UEs for data transmission on the downlink or the uplink.

In some cases, UE 115 and base station 105 may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen-before-talk or listen-before-transmitting (LBT) procedure such as a clear channel assessment (CCA) prior to communicating in order to determine whether the shared channel is available. In some implementations, a CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel or the acknowledge/negative-acknowledge (ACK/NACK) feedback for its own transmitted packets as a proxy for collisions.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3A:
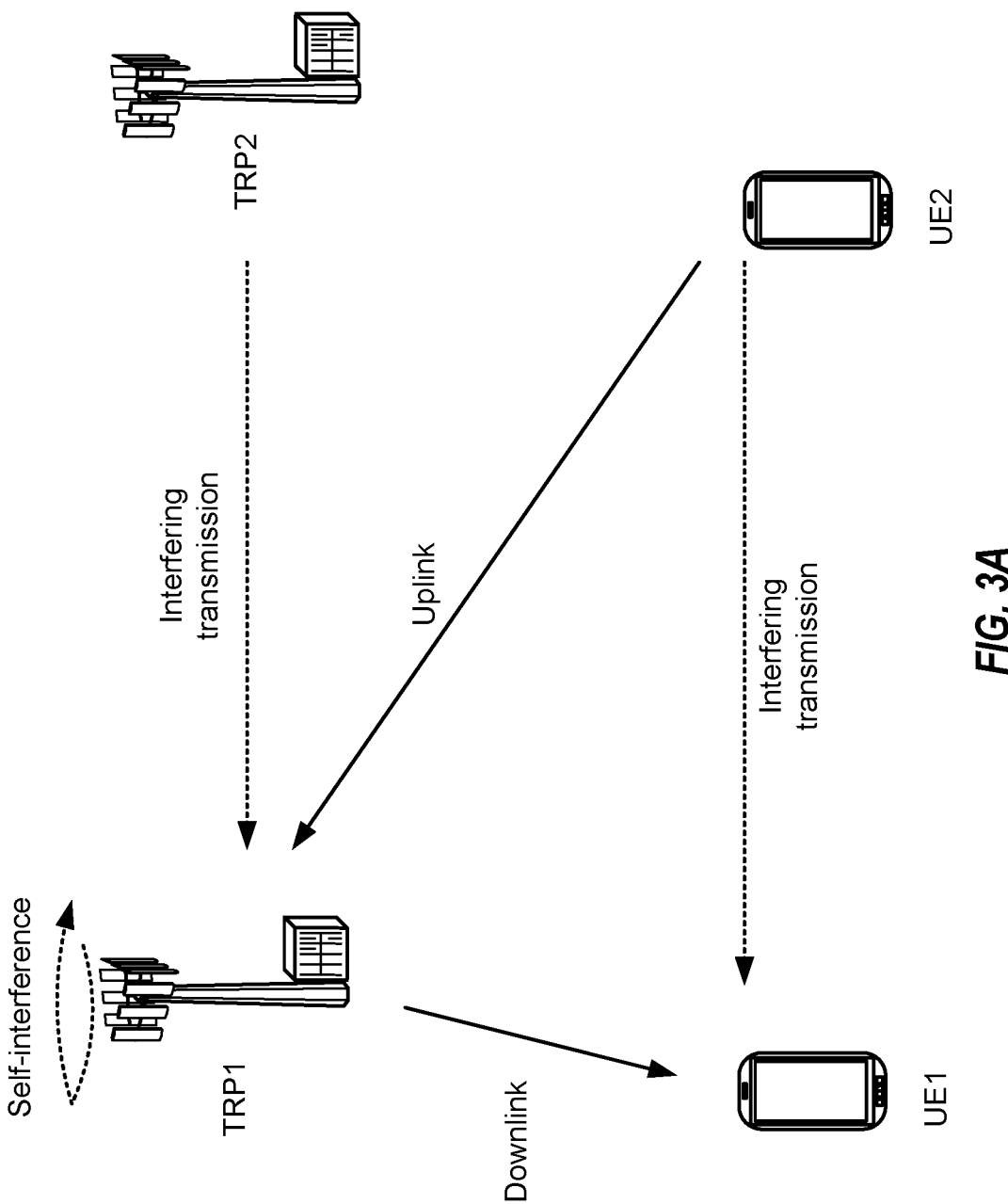
FIG. 3A is a diagram of a first example of full-duplex operations.
Figure 3B:
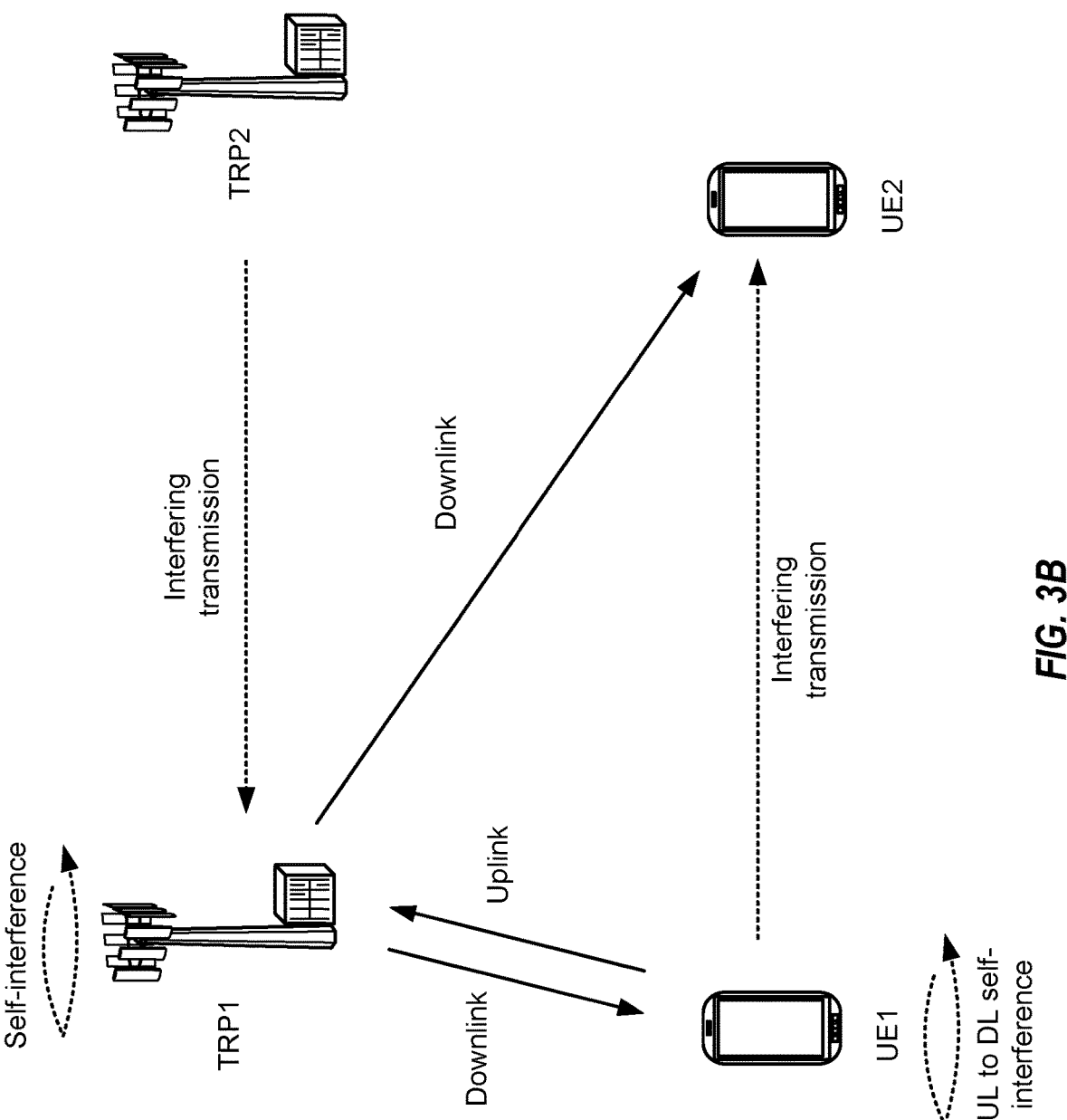
FIG. 3B is a diagram of a second example of full-duplex operations.
Figure 3C:
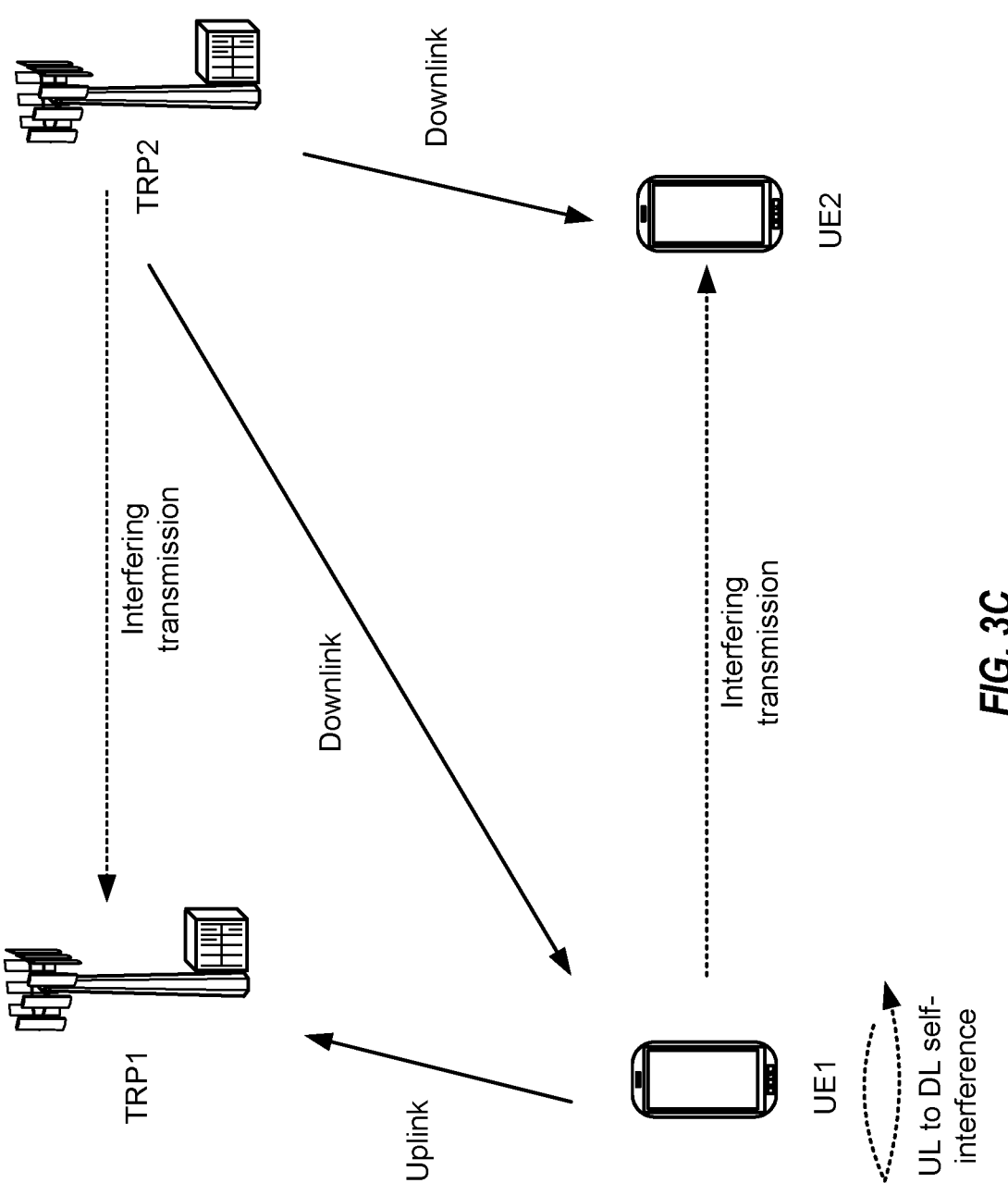
FIG. 3C is a diagram of a third example of full-duplex operations.

FIGS. 3A, 3B, and 3C illustrate examples of full-duplex communication modes. In FIG. 3A, full-duplex base station and half-duplex UE operations are shown, in FIG. 3B, full-duplex base station and full-duplex UE operations are shown, and in FIG. 3C, full-duplex UE operations (e.g., subband full-duplex (SBFD) UE operations) with a full-duplex base station with multiple TRPs are shown. Full-duplex operation corresponds to transmitting and/or receiving data via multiple antennas at the same time. Half-duplex operation corresponds to transmitting or receiving data via a single antenna at a particular time.

FIGS. 3A, 3B, and 3C depict interference caused from full-duplex operations. To illustrate, external interference (e.g., channel link interference) and self-interference may be caused during full-duplex operations. External interference is caused from external sources, such as a from a nearby UE or base station. Self-interference is caused by the device itself from performing multiple operations. Self-interference may be caused by leakage, such as when transmitting energy from a transmitting antenna is received by receiving antenna directly or indirectly (e.g., by reflection).

In FIGS. 3A, 3B, and 3C, multiple TRPs are illustrated, such as a first TRP (TRP1) and a second TRP (TRP2). The first and second TRPs may include or correspond to the same base station, such as the same gNB, or to different base stations. In FIGS. 3A, 3B, and 3C, the first TRP (TRP1) may be operating in the same frequency band or in different frequency bands. For example, the first TRP (TRP1) may be operating in a first frequency band, such as FR 4 or 60 GHz, and the second TRP (TRP2) may be operating in a second frequency band, such as FR 2 or 28 GHz.

Additionally, multiple UEs are illustrated in FIGS. 3A, 3B, and 3C, such as a first UE (UE1) and a second UE (UE2) In some implementations, the UE is a full-duplex capable UE with multiple antenna module. FIGS. 3A, 3B, and 3C further depict signal paths between the TRPs and the UES.

Referring to FIG. 3A, FIG. 3A illustrates an example diagram 300 for a first type of full-duplex communication. Referring to FIG. 3A, the diagram 300 illustrates two signal paths (beam paths) between the TRPs and the UEs and example interference. In the example illustrated in FIG. 3A, the first TRP (TRP1) transmits downlink data via a first signal path to the first UE (UE1) and the first TRP (TRP2) receives uplink data via a second signal path from the second UE (UE2). The first TRP and UE experience interference. For example, the first TRP experiences self-interference from simultaneously transmitting and receiving. Additionally, devices receive interference caused by other nearby devices. For example, operations of the second TRP 2 may cause interference at all other nodes, such as the first UE and first TRP as illustrated in FIG. 3A. Additionally, the transmission of uplink data by the second UE may cause interference at the first UE, as shown, and at the second TRP. Operations at the second TRP may also cause interference at other devices, such as at the first TRP as shown in FIG. 3A.

Referring to FIG. 3B, FIG. 3B illustrates an example diagram 310 for a second type of full-duplex communication. Referring to FIG. 3B, the diagram 310 illustrates three signal paths (beam paths) between the TRPs and the UEs and example interference. In the example illustrated in FIG. 3B, the first TRP (TRP1) transmits downlink data via a first signal path to the first UE (UE1) and the first TRP (TRP1) receives uplink data via a second signal path from the first UE (UE1). Additionally, the second TRP (TRP2) transmits downlink data via a third signal path to the second UE (UE2). The first TRP experiences interference. For example, the first TRP experiences self-interference from simultaneously transmitting and receiving and from the operations of the second TRP and UE. Additionally, other devices may receive interference caused by the operation other nearby devices, as described with reference to FIG. 3A.

Referring to FIG. 3C, FIG. 3C illustrates an example diagram 320 for a third type of full-duplex communication.

Referring to FIG. 3C, the diagram 320 illustrates three signal paths (beam paths) between the TRPs and the UEs and example interference. In the example illustrated in FIG. 3C, the first TRP (TRP1) receives uplink data via a first signal path from the first UE (UE1), and the second TRP (TRP2) transmits downlink data via a second signal path to the first UE and transmits downlink data via a third signal path the second UE (UE2). The devices may receive interference caused by their own full-duplex operations and/or the operation of other nearby devices, as described with reference to FIGS. 3A and 3B.

Figures 3D, 3E, 3F:
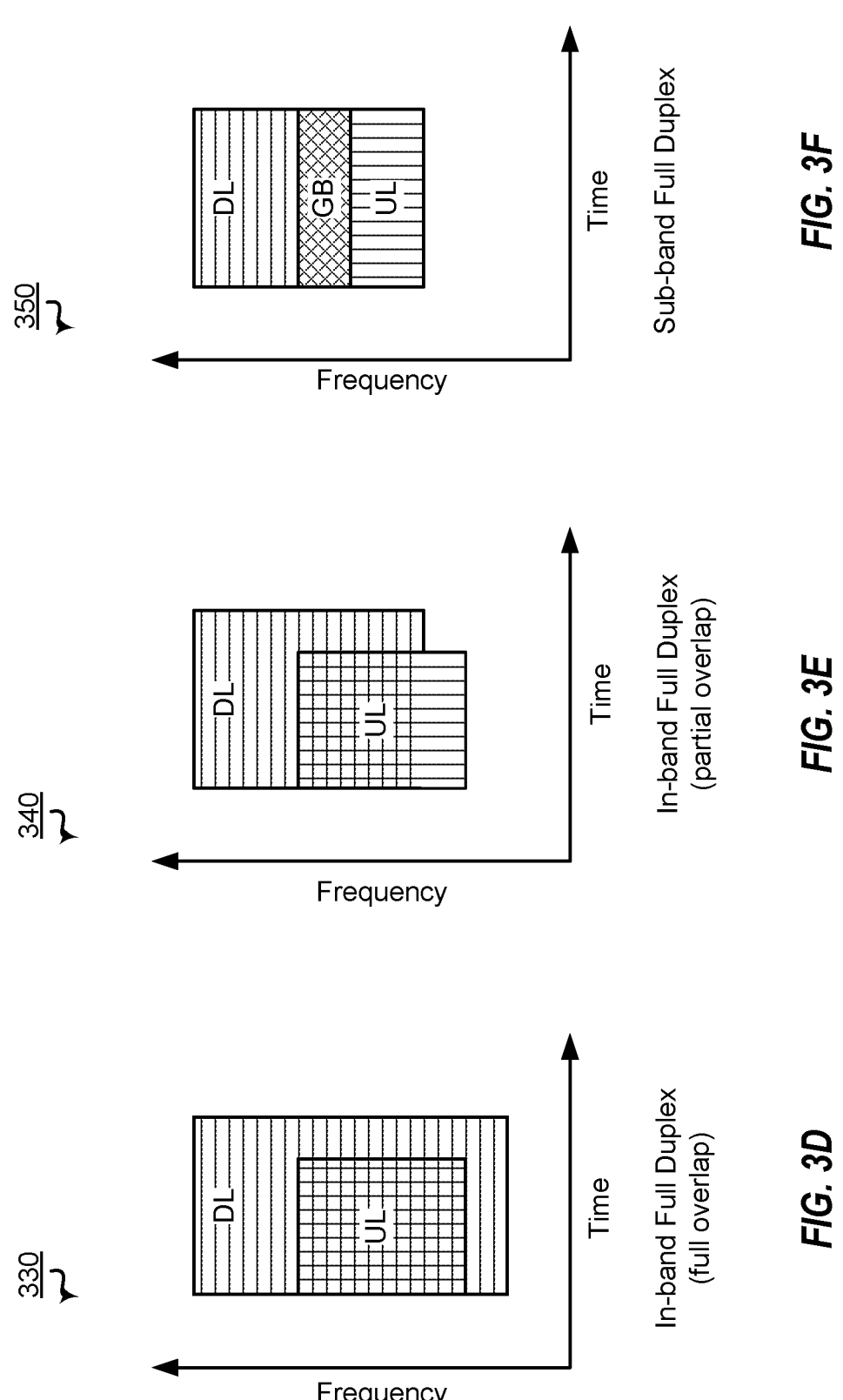
FIG. 3D is a diagram of a fourth example of full-duplex operations.
FIG. 3E is a diagram of a fifth example of full-duplex operations.
FIG. 3F is a diagram of a sixth example of full-duplex operations.

FIGS. 3D, 3E, and 3F illustrate examples of full-duplex communication operations. In FIGS. 3D and 3F, in-band full-duplex (IBFD) operations are shown, and in FIG. 3E subband full-duplex operations are shown. In-band full-duplex (IBFD) operation corresponds to transmitting and receiving on the same time and frequency resources. As shown in diagrams 330 and 340 of FIGS. 3D and 3E, the downlink and uplink resources share the same time and frequency resource. The downlink and uplink resources may fully or partially overlap, as shown in FIGS. 3D and 3E respectively. Subband full-duplex operation, often referred to as frequency division duplexing (FDD) or flexible duplex, corresponds to transmitting and receiving data at the same time but on different frequency resources. As shown in diagram 350 of FIG. 3F, the downlink resource is separate from the uplink resource by a relatively "thin" guardband. The guardband in FIG. 3F is enlarge for illustrative purposes. The guardband is what generally distinguishes SBFD from paired spectrum (e.g., IBFD) in current wireless standard specifications.

Figures 3G, 3H, 3I, 3J, 3K:
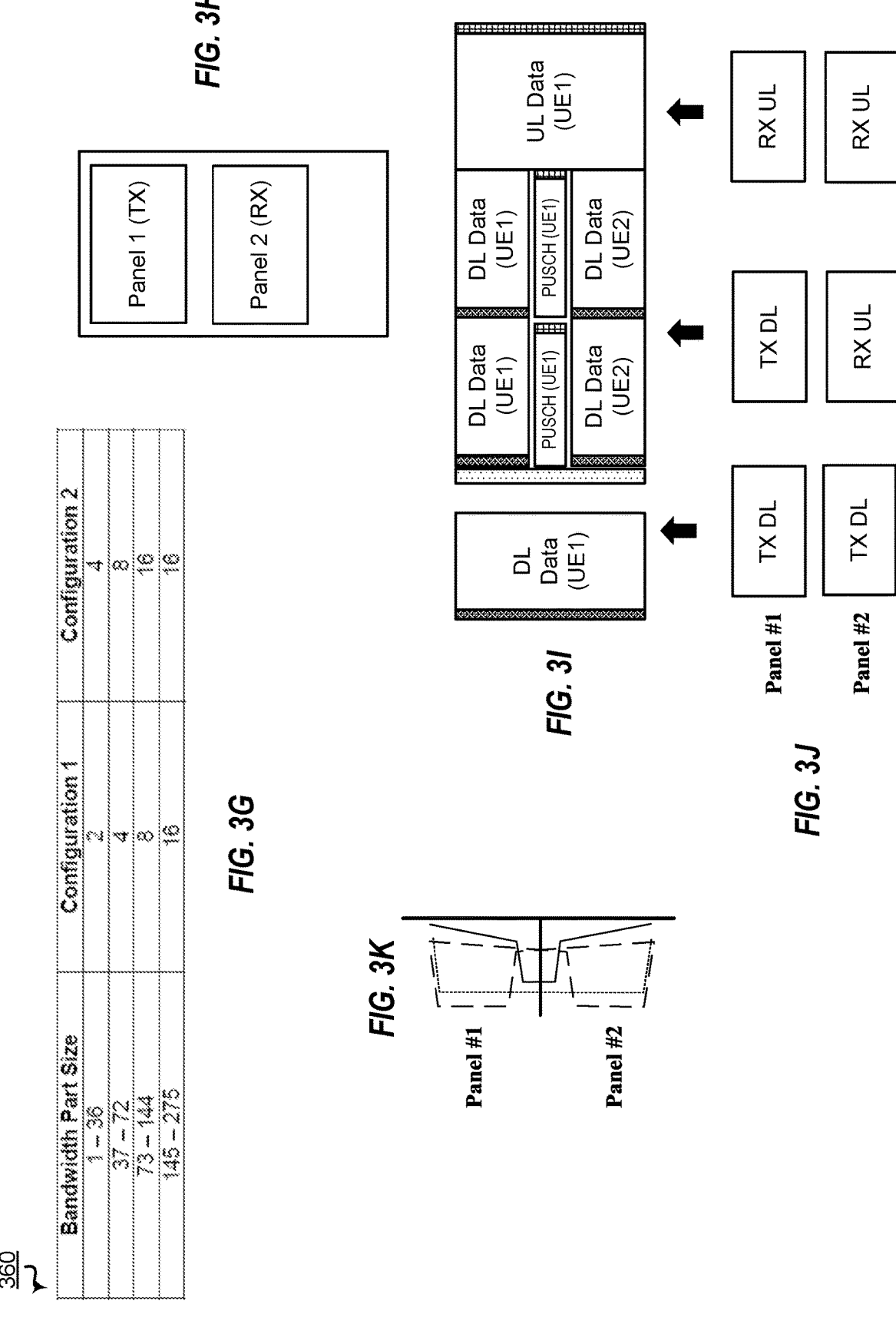
FIG. 3G is a diagram of an example of a BWP switching delay table.
FIG. 3H is a diagram of an example antenna layout.
FIG. 3I is a diagram of an example timing diagram.
FIG. 3J is a diagram illustrating antenna operations for the antenna layout of FIG. 3H during the timing diagram of FIG. 3I.
FIG. 3K is a diagram illustrating antenna leakage for the antenna layout of FIG. 3H during the timing diagram of FIG. 3I.

FIG. 3G illustrates an example of table for RBG size for given combinations of FDRA length for corresponding BWP sizes. FIG. 3G illustrates an RBG size table 360. Referring to FIG. 3G, configurations 1 and 2 correspond to configurations of the FDRA field. Configuration 1 indicates a 9 bit length FDRA field and a 9 bit bitmap, and configuration 2 indicates an 18 bit length FDRA field and an 18 bit bitmap. Based on a size of the BWP (e.g., active or configured BWP), the device may determine a RBG size. For example, based on the BWP size being 1-36 resource blocks and a configuration of 1, the RBG size is 2, 2 RBG per bit in the bitmap represented by the FDRA.

FIG. 3H is a diagram of an example antenna layout, and FIG. 3I is a diagram of an example timing diagram. FIG. 3J is a diagram illustrating antenna operations for the antenna layout of FIG. 3H during the timing diagram of FIG. 3I. FIG. 3K is a diagram illustrating antenna leakage for the antenna layout of FIG. 3H during the timing diagram of FIG. 3I.

Referring to FIG. 3H, an antenna architecture is illustrated with two separate panels for simultaneous transmit and receive operations (full-duplex (FD) operations). In some implementations, panel #1 is for DL transmission at both edges of a band, and panel #2 is for UL reception at a middle of the band. Such an architecture may improve isolation, such as by greater than 50 dB.

When operating in subband full-duplex, the isolation may be improved by greater than 40 dB by having downlink and uplink in a different portion of the band and a guardband between the uplink and downlink portions and by utilizing one or more other improvements. The improvements may include using receive Weighted OverLap and Add (WOLA) to reduce Adjacent Channel Leakage Ration (ACLR) leakage to uplink signals, include an analog low pass filter (LPF) to improve the dynamic range of an analog-to-digital converter (ADC), and/or include an improvement in receive Automatic Gain Control (AGC) states to improve the noise figure (NF).

In addition to or in the alternative of such improvements, a digital integrated circuit of the ACLR may lead to a 20 dB or greater improvement by using a non-linear model for each transmit and receive pair.

Referring to FIG. 3I, an example timing diagram for FDD is illustrated where both panels operate, i.e., operate in full-duplex. FIG. 3J illustrates how the panels of FIG. 3H operate during the timing diagram of FIG. 3I. FIG. 3K illustrates antenna performance of FIG. 3H during the timing diagram of FIG. 3I.

By avoiding switching BWPs, a network can configured slots, be more flexible, resulting in higher throughput and less overhead. Additionally, the network will have much less latency. For example, a delay incurred in BWP switching is dependent on time and UE capability. To illustrate, the slot length (time in milliseconds) and type of the UE (Type 1 or Type 2) can be used to determine a delay in slots for switching a BWP. The delay may also be dependent on sub-carrier spacing.

Figure 4:
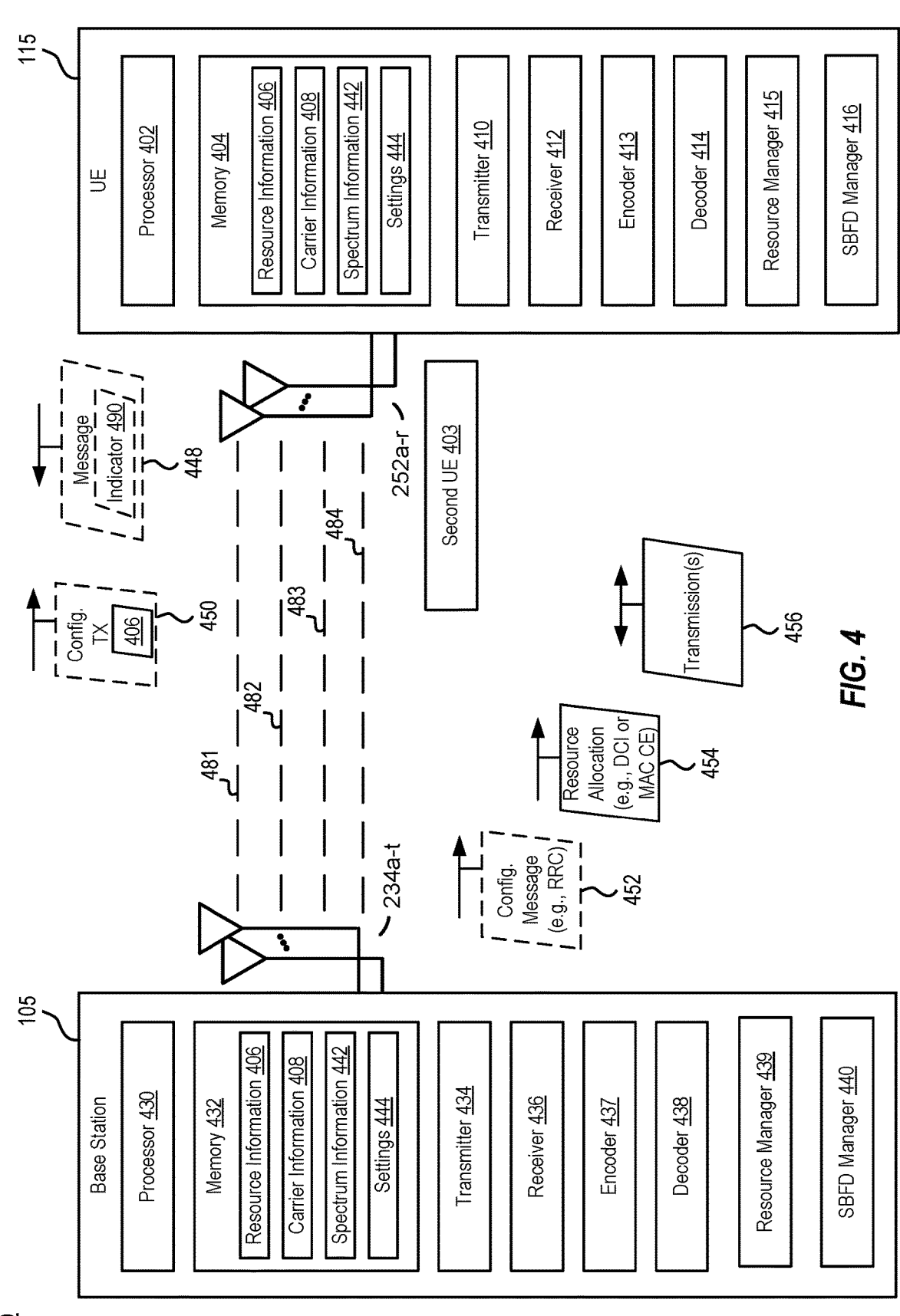
FIG. 4 is a block diagram illustrating an example wireless communication system that supports enhanced frequency domain resource allocation according to one or more aspects.

FIG. 4 illustrates an example of a wireless communications system 400 that supports enhanced frequency domain resource allocation in accordance with aspects of the present disclosure. In some examples, wireless communications system 400 may implement aspects of wireless communication system 100. For example, wireless communications system 400 may include a network, such as one or more network entities, and one or more UEs, such as UE 115 (also referred to as a first UE) and second UE 403. As illustrated in the example of FIG. 4, the network entity includes a corresponds to a base station, such as base station 105. Alternatively, the network entity may include or correspond to a different network device (e.g., not a base station). Enhanced frequency domain resource allocation may reduce latency and increase throughput. For example, avoiding switches BWP reduces latency and increases throughput by avoiding incurring delays in switching BWPs. Accordingly, network and device performance can be increased.

Base station 105, UE 115, and second UE 403 may be configured to communicate via one or more portions of the electromagnetic spectrum. The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "mmWave" band in documents and articles, despite being different from the extremely high frequency (EHF) band (30 GHz-300 GHz) which is identified by the International Telecommunications Union (ITU) as a "mmWave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "mmWave" or the like if used herein may broadly represent frequencies that may include mid-band frequencies, may be within FR2, or may be within the EHF band.

It is noted that SCS may be equal to 15, 30, 60, or 120 kHz for some data channels. Base station 105 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, or a Bandwidth Part (BWP) ID. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management or BWP switching functionality. In some implementations, two or more CCs are quasi co-located, such that the CCs have the same beam and/or same symbol.

In some implementations, control information may be communicated via base station 105, UE 115, and second UE 403. For example, the control information may be communicated suing MAC-CE transmissions, RRC transmissions, DCI (downlink control information) transmissions, UCI (uplink control information) transmissions, SCI (sidelink control information) transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, resource manager 415, SBFD manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store resource allocation information data 406, carrier information data 408, spectrum information data 442, settings data 444, or a combination thereof, as further described herein.

The resource allocation information data 406 includes or corresponds to data associated with or corresponding to resources of the bandwidth allocated for a particular transmission (or transmissions) in a slot. For example, the resource allocation information data 406 may include resource element data. The resource element (RE) data may include data on physical layer resource elements, such as resource blocks or groups thereof. The resource element data may include a number of RE groups (or RB groups (RBGs)) and/or an identification of RBGs (such as by an offset from a reference or core RBG). In some implementations, the resource element data is indicated by a bitmap which corresponds to RBGs of an active BWP. As explained in more detail below, the bitmap may correspond to an entirety of the RBGs of the BWP, or only to RBGs of the BWP with partially or fully overlap a corresponding transmission band (e.g., DL transmission band for DL BWP).

In other examples, the resource element data may include a starting resource element for a particular transmission and a quantity of resource elements (e.g., continuous or contiguous REs) for the particular transmission. In such implementations, the resource element data may be associated with or referred to as resource information or timing information. For example, a single indicator (e.g., a resource indicator value (RIV) or start and length indicator value (SLIV)) may be used to indicate both a starting RE (or RB) and a quantity (e.g. number or amount) of REs (or RBs).

In some implementations, the resource allocation information data 406 further includes timing information, such as TDRA information. The timing information may be included in or indicated by a TDRA field. The timing information may indicate a particular slot for the transmission. For example, the TDRA field may indicate an offset in time or slots for a particular transmission and may be associated with other transmission information, such as FDRA information. The timing information may be used to determine a particular slot configuration, through identification of the slot.

Additionally, or alternatively, the resource allocation information data 406 may include resource configuration data. The resource configuration data may include or correspond to values identifying or indicating a RBG size. The RBG size may include or correspond to a value identifying a quantity of RBs per group. A number of REs per RB may be fixed by the network or otherwise indicated, such as by RB size. Each BWP and/or subband may have its own RBG size, thus, the resource configuration data may include BWP or band specific RBG sizes. The resource allocation information data 406 may include data received from the network (e.g., base station 105) and/or programmed into the memory 404. The resource allocation information data 406 may be configured by RRC and/or modified by MAC-CE, DCI and/or other control signaling (e.g., broadcast spectrum control signaling).

The carrier information data 408 includes or corresponds to data associated with or corresponding to carrier configurations. For example, the carrier information data 408 may include carrier configurations information. The carrier configurations information may include information for one or more settings or parameters of a component carrier, channel, and/or cell. For example, the carrier configurations information may include RBG size information, transmission type information, slot type information, channel bandwidth information, frequency band information, SCS information, bandwidth part (BWP) information, etc.

The transmission type information may include or correspond to information which indicates an operational mode or non-full-duplex slot format, uplink, downlink, sidelink, broadcast, etc. The slot type information may include information indicating a particular slot configuration, location and size of a band or subbands thereof, of multiple slots of a frame. For example, the slot type may include indications of UL, DL, and mixed, Full-duplex, slot configurations for each slot of a radio frame or subframe. Additionally, the slot type information may include multiple types of full-duplex configurations and subtypes. For example, the slot type information may include in-band non-overlapping (SBFD), partially overlapping, or fully overlapping configurations (as shown in FIGS. 3D-3F), and one or more sub-configurations for each type, such as shown in FIGS. 7A-9B. The BWP information includes or indicates one or more configured BWPs and an active BWP. The BWP information may further include or indicate a BWP size and placement for one or more of the configured BWPs.

The spectrum information data 442 includes or corresponds to data indicating or corresponding to spectrum allocations and/or configuration. For example, the spectrum information data 442 may include or correspond to spectrum configuration data. The spectrum configuration data may include configuration information for different frequency spectrums, such as LTE, 5G, FR1, FR2, terrestrial broadcast, etc. For example, the spectrum configuration data may include out of band emission (DOBE) requirements or a spectral efficiency mask (SEM). Such settings may be used to determine amount of resource blocks and/or the spacing for guardbands between different subbands of a slot.

Scheduling information may include or be indicative of one or more pieces of information used to schedule a particular transmission or transmissions. For example, scheduling information may include or be indicative of one or more of the resource allocation information data 406, the carrier information data 408, or the spectrum information data 442.

Scheduling information may include one or more component pieces of information. In a particular example, scheduling information includes configuration information (e.g., channel configuration information) and resource allocation information. In some implementations, the resource allocation information includes the timing information and in other implementations the scheduling information includes the timing information.

The settings data 444 includes or corresponds to data associated with enhanced frequency domain resource allocation operations. The settings data 444 may include one or more types of enhanced frequency domain resource allocation operation modes and/or thresholds or conditions for switching between enhanced frequency domain resource allocation modes and/or configurations thereof. For example, the settings data 444 may have data indicating different thresholds and/or conditions for different enhanced frequency domain resource allocation modes, such as a fixed length field mode, transmit overlap mode, no transmit overlap mode, variable length field mode, etc., or a combination thereof.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410 or receiver, 412 may include or correspond to one or more components of UE 115 described with reference to FIG. 2.

Encoder 413 and decoder 414 may be configured to encode and decode data for transmission. Resource manager 415 (or resource allocation manager) may be configured to perform resource allocation determination operations. For example, resource manager 415 may be configured to determine and/or indicate resources for particular transmissions based on a bitmap. To illustrate, the resource manager 415 may determine a non-contiguous subset of resource elements from a larger pool of resource elements based on the bitmap, where the subset of resource elements overlap applicable transmission bands or subbands.

In some implementations, the resource manager 415 determines groups of resource blocks (RBGs), which include a variable quantity of RBs and where each RB includes a number of REs, based on the bitmap. The RB Gs which represent the transmission bandwidth correspond to the locations of bits of the bitmap which have a particular value, such as 0 or 1. The resource manager 415 may be configured to interpret an FDRA field to determine the resource allocation. The FDRA field may be interpreted based on a slot configuration, such as where the subbands are located and overlap the active BWP in a given slot. The resource manager 415 may determine effective bits of a preset length field (e.g., 9 or 18 bit length field), that is which bits of the FDRA field carry resource allocation information (e.g., FDRA information) and which bits of the FDRA field carry non-resource allocation information, or the resource manager 415 may determine a length (quantity of bits) of a field (e.g., FDRA field) that carries the resource allocation information when the field has a variable length. Examples of determining effective bits are shown and described further with reference to FIGS. 7A-8B and examples of determining variable field length are shown and described further with reference to FIGS. 9A-9B.

SBFD manager 416 may be configured to perform improved SBFD operations, such slot configuration and timing operations for SBFD. For example, SBFD manager 416 may be configured to a timing for a particular transmission. To illustrate, the SBFD manager 416 may receive timing information, such as a TDRA filed, and determine a particular slot for a corresponding transmission based on the timing information. The TDRA field may be associated with the FDRA field.

Additionally, SBFD manager 416 may be configured to determine a slot configuration for a particular slot and transmission. For example, SBFD manager 416 may be configured to receive slot type information, such as via RRC, and may determine slot configurations for a plurality of slots, such as plurality of slot of a radio frame. To illustrate, the slot type information may indicate a first slot is a DL slot, a second slot is an UP slot, a third slot is FD type 1, a fourth slot is SBFD type 1, a fifth slot is SBFD type 2, etc., and each slot having its own slot configuration which indicates the band or subbands of the slot. Examples of slot configurations are illustrated in FIGS. 3D-3F and FIGS. 7A-9B. The SBFD manager 416 may be configured to determine the slot configuration for the particular slot and transmission based on the slot type/configuration which matches the slot identified by the timing information.

Second UE 403 may include one or more elements similar to UE 115. In some implementations, the UE 115 and the second UE 403 are different types of UEs. For example, either UE may be a higher quality or have different operating constraints. To illustrate, one of the UEs may have a larger form factor or be a current generation device, and thus have more advanced capabilities and/or reduced battery constraints, higher processing constraints, etc.

Base station 105 includes processor 430, memory 432, transmitter 434, receiver 436, encoder 437, decoder 438, resource manager 439, SBFD manager 440, and antennas 234*a-t*. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store resource allocation information data 406, carrier information data 408, spectrum information data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, UEs and/or base station 105 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434 or receiver, 436 may include or correspond to one or more components of UE 115 described with reference to FIG. 2.

Encoder 437, and decoder 438 may include the same functionality as described with reference to encoder 413 and decoder 414, respectively. Resource manager 439 may include similar functionality as described with reference to resource manager 415. For example, the resource manager 439 may be configured to determine and generate resource allocation information (e.g., a FDRA field) for a slot and transmission which can be interpreted by another device based on a slot configuration of the slot. SBFD manager 440 may include similar functionality as described with reference to SBFD manager 416.

During operation of wireless communications system 400, the network (e.g., base station 105) may determine that UE 115 has enhanced frequency domain resource allocation capability. For example, UE 115 may transmit a message 448 that includes an enhanced frequency domain resource allocation indicator 490 (e.g., an enhanced frequency domain resource allocation capability indicator). Indicator 490 may indicate enhanced frequency domain resource allocation capability for one or more communication modes, such as downlink, uplink, etc. In some implementations, a network entity (e.g., a base station 105) sends control information to indicate to UE 115 that enhanced frequency domain resource allocation operation and/or a particular type of enhanced frequency domain resource allocation operation is to be used. For example, in some implementations, configuration transmission 450 is transmitted to the UE 115. The configuration transmission 450 may include or indicate to use enhanced frequency domain resource allocation operations or to adjust or implement a setting of a particular type of enhanced frequency domain resource allocation operation. For example, the configuration transmission 450 may include carrier information data 408, as indicated in the example of FIG. 4, spectrum information data 442, settings data 444 or any combination thereof.

During operation, devices of wireless communications system 400, perform enhanced frequency domain resource allocation operations. For example, the network and UE 115 may exchange transmissions via uplink and/or downlink communications in a full-duplex manner (e.g., SBFD manner) with enhanced resource allocation flexibility as illustrated in the example of FIG. 4. This enhanced resource allocation flexibility enables devices to adjust resources and increase throughput by operating in FD (simulations transmission and reception) without switching a BWP and incurring a switching delay. The enhanced resource allocation flexibility may be achieved by using variable length resource allocation information where a length of the resource allocation information indicates the transmission bandwidth (and which RBGs are used for the transmission). Devices may determine the variable length resource allocation information (effective bits of a preset length field(s) or a length of a variable length field) based on transmission type or slot configuration information.

In the example of FIG. 4, the base station 105 optionally transmits a configuration message 452 to the UE 115 via a downlink channel. In some implementations, the configuration message 452 includes slot type information or transmission type information. For example, the slot type information may include information indicating a particular slot configuration, location and size of a band or subbands of slots of a frame. As another example, the transmission type information may indicate UL, DL, half-duplex (HD), FD, etc. The configuration message 452 corresponds to a RRC message in the example of FIG. 4. In other implementations, the configuration message 452 may include or correspond to broadcast message, a PDCCH, SCI, a SL-MAC-CE, or a SL-RRC message.

Additionally or alternatively, the configuration message 452 may include bandwidth part information or RBG size information. For example, the configuration message 452 may indicate multiple configured BWPs and an active BWP. As another example, the configuration message may indicate a number of RB s per RBG group of each BWP or for at least the active BWP.

The base station 105 transmits the resource allocation information 454 to the UE 115 via a downlink channel for a particular transmission in a particular slot. For example, the base station 105 may transmit resource allocation information 454 in as second message or transmission separate from the configuration message 452, such as scheduling or signaling message for the particular transmission. Alternatively, the base station 105 may transmit the resource allocation information 454 in the configuration message 452 in other implementations. The message which carries the resource allocation information 454 may configure periodic or aperiodic transmissions.

Additionally or alternatively, the resource allocation information 454 may be sent with or as part of other information, such as scheduling information. The scheduling information may include other types of information, such as timing information (e.g., TDRA field), RBG size, BWP information, or a combination thereof. The resource allocation information 454 may be sent in a transmission or message with may include or correspond to a PDCCH transmission, such as DCI, a PDSCH transmission, a MAC-CE transmission, a SL transmission, a broadcast transmission, etc.

As illustrative, non-limiting examples, the band (location and channel bandwidth), SCS and numerology (cyclic prefix) may be indicated in the locationAndBandwidth, subcarrierSpacing and cyclicPrefix fields of a BWP information element, such as in the IE BWP. Bandwidth parts and information thereof may be further configured by the IE ServingCellConfig. A number of consecutive RBs may be indicated using the higher layer parameter rbg-Size configured by PDSCH-Config for resource allocation Type 0, or using a resource indication value (RIV) that provides both a start RB number and length in terms of consecutive resource blocks for resource allocation Type 1.

The UE 115 determines the resource allocation for the particular slot and transmission based on at least the resource allocation information 454. For example, the UE 115 parses or interprets a field of information corresponding to the resource allocation information 454 based on the active BWP and a slot configuration. To illustrate, the UE 115 may receive and/or determine the active BWP or the slot configuration based on the configuration message 452 and/or the signaling/scheduling message.

In some implementations, the UE 115 interprets the field to determine effective bits of the field. For example, the field may include or correspond to a bitmap where the bits of the bitmap map or correspond to RBGs of the active BWP part. The UE 115 may determine that particular bits of the bitmap are active or can potentially be used for the transmission of the slot based on the slot configuration of the slot. That is, the UE 115 may determine which RBGs of the active BWP and corresponding bits of the bitmap coincide with or overlap with a band or subbands of the slot. The UE 115 may also determine which RBGs of the active BWP and corresponding bits of the bitmap do not coincide with or do not overlap with the band or the subbands of the slot.

The UE 115 may determine that a quantity and location of the bits of the effective bits (first bits with resource allocation/FDRA information), which are bits of the bitmap where the corresponding RBGs overlap the corresponding subbands (e.g., DL BWP and DL subband) where a transmission is possible. as described and shown with reference to FIGS. 7A-9B. The UE 115 may also determine second bits (quantity and location of the bits) which do not include resource allocation/FDRA information, which are bits of the bitmap where the corresponding RBGs do not overlap the corresponding subbands (e.g., DL BWP and DL subband) and indicate where a transmission is not possible for that slot/slot configuration, as described and shown with reference to FIGS. 7A-9B.

In other implementations, the UE 115 determines a length of a variable length resource allocation field and interprets or parses the field based on the determined length. For example, the field may include or correspond to a variable length bitmap where the bits of the bitmap map or correspond to a subset of RBGs of the active BWP part which overlap corresponding subbands (e.g., DL BWP and DL subband) where a transmission is configurable or possible for that slot. The UE 115 may determine that the quantity of bits of the bitmap based on a RBG size of each subband. Subbands may have the same RBG size or different RBG sizes. Based on the amount of overlap and the amount of RBG size, the UE 115 may determine how many bits it needs to convey the overlapped RBGs and the mapping of RBGs to bits. For example, in split subbands, a bitmap of 3 bits may include 1 bit in a first subband and 2 bits in a second subband or 2 bits in a first subband and 1 bit in a second subband based on amount of overlap and RBG size, as described and shown with reference to FIGS. 7A-9B.

The UE 115 transmits or receives a transmission or transmissions 456 based on the resource allocation information 454. For example, the UE 115 transmits or receives a transmission or transmissions 456 based on the identified RBGs from the resource allocation information 454. To illustrate, the UE 115 may transmit or receive a transmission using specific RBGs identified by the bitmap indicated by the resource allocation of the signaling/scheduling message.

In some implementations, the UE 115 transmits or receives the transmission or transmissions 456 based on the scheduling information, such as the configuration information, the resource allocation information 454, and the timing information. For example, the UE 115 transmits or receives a transmission or transmissions 456 based on one or more of the configuration message 452 and the resource allocation information 454.

Scheduling information may include or correspond to resource information in a particular domain. For example, the scheduling information may include or correspond to a frequency domain resource assignment (frequency domain resource assignment information) or a timing domain resource assignment (timing domain resource assignment information). The scheduling information may include time and/or frequency information for transmission resources.

Figure 5:
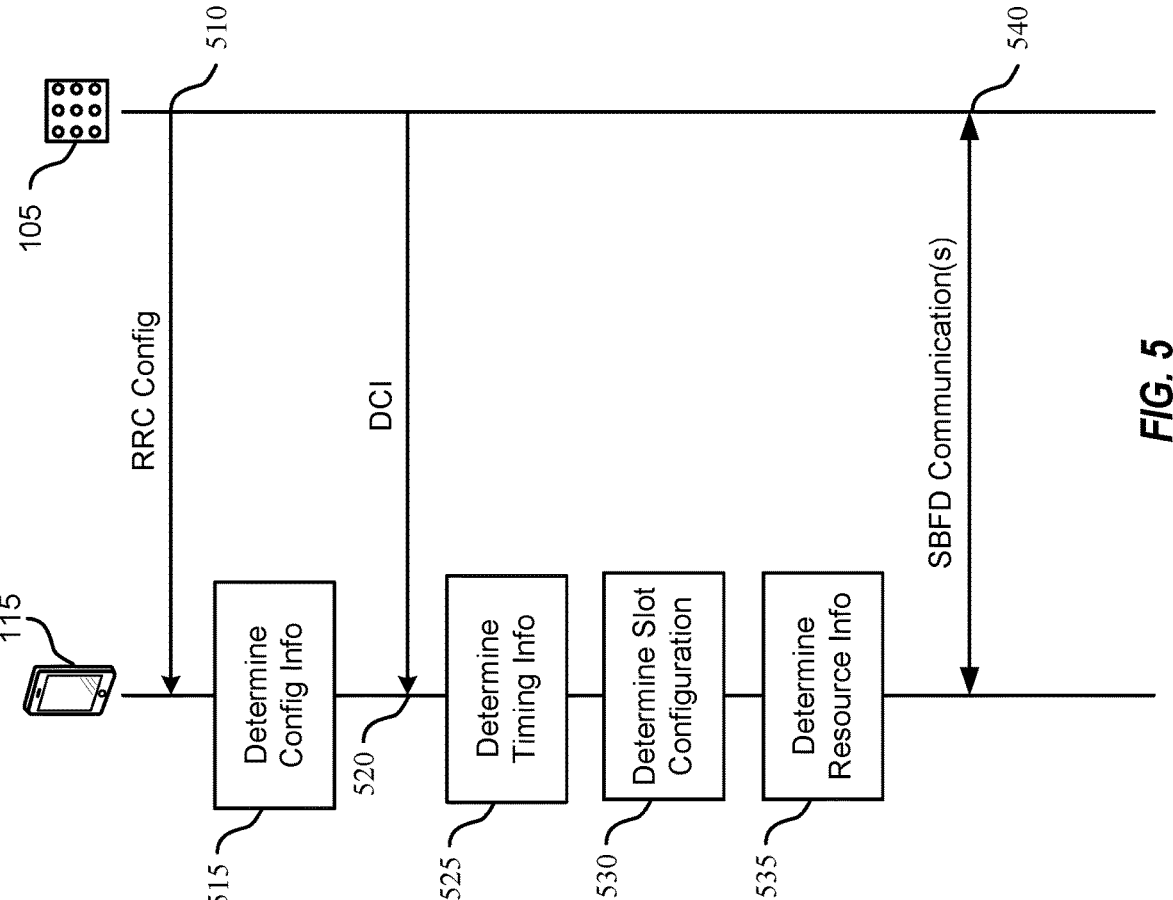
FIG. 5 is a flow diagram illustrating an example process that supports enhanced frequency domain resource allocation according to one or more aspects.
Figure 6:
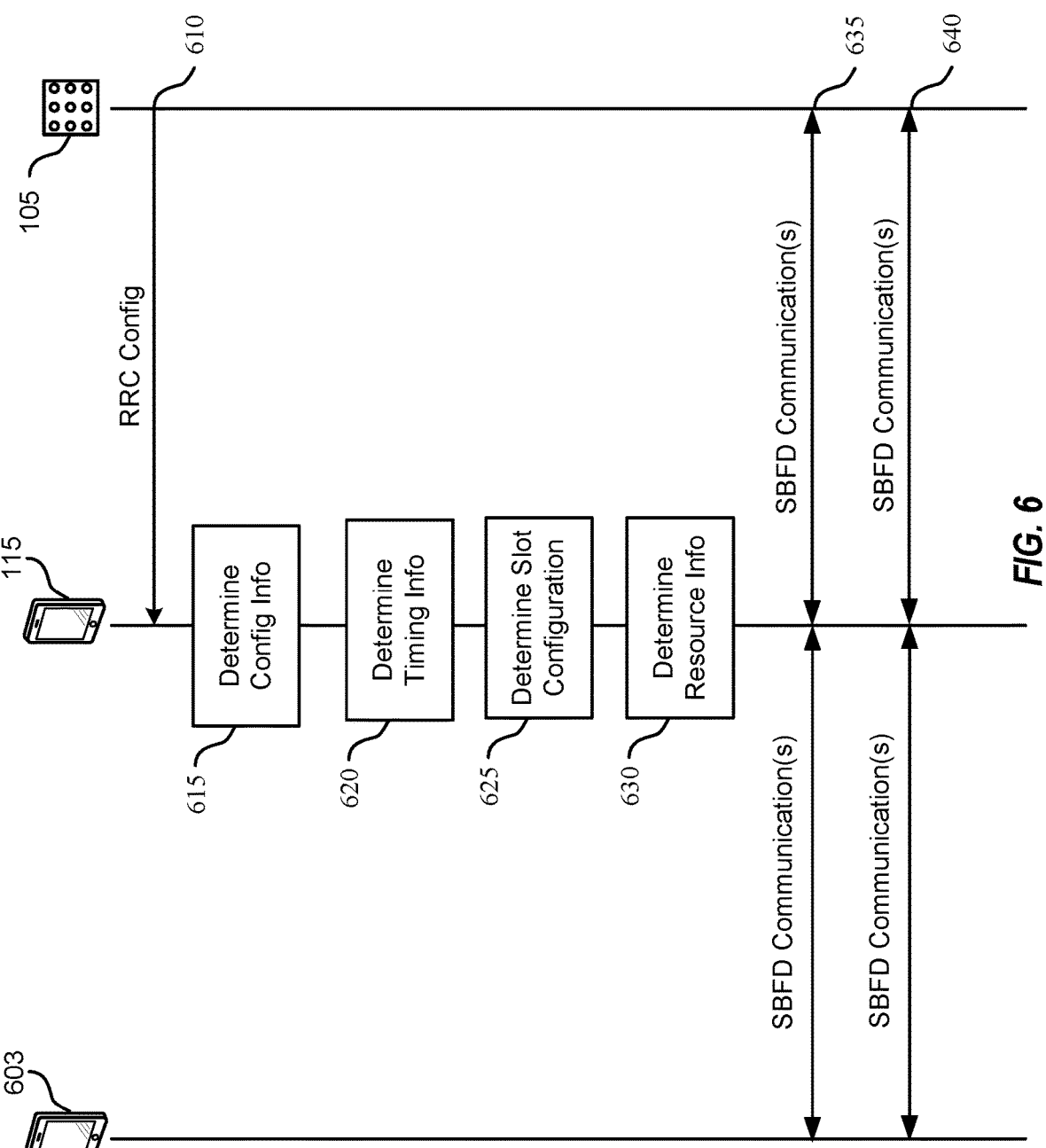
FIG. 6 is a flow diagram illustrating an example process that supports enhanced frequency domain resource allocation according to one or more aspects.

In some implementations, the UE 115 may transmit or receive additional transmissions (e.g., periodic) of the transmissions 456 based on the scheduling information, as described further with reference to FIG. 6. In other implementations, the UE 115 may transmit or receive second transmissions (e.g., aperiodic) of the transmissions 456 based on second scheduling information received in additional transmissions, such as a second signaling transmission, as described further with reference to FIG. 5.

Accordingly, the network (e.g., the base station 105, the UE 115, and the second UE 403) may be able to more efficiently and effectively make use of available spectrum by using more of the available spectrum through improved flexible scheduling without BWP switching. Improved spectrum utilization through enhanced frequency domain resource allocation may increase throughput and reduce latency, which may lead to reduced link failures. Accordingly, the network performance and experience may be increased due to the increases in speed and reductions in failure.

Referring to FIG. 5, FIG. 5 is a timing diagram 500 illustrating a wireless communication system that supports enhanced frequency domain resource allocation according to one or more aspects. The example of FIG. 5 corresponds to an example of enhanced frequency domain resource allocation for aperiodic operations.

The example of FIG. 5 includes similar devices to the devices described in FIGS. 1, 2, and 4, such as a UE 115 and a network entity (e.g., base station 105). The devices of FIG. 5 may include one or more of the components as described in FIGS. 2 and 4. In FIG. 5, these devices may utilize antennas 252*a-r*, transmitter 410, receiver 412, encoder 413 and/or decoder 414, or may utilize antennas 234*a-t*, transmitter 434, receiver 436, encoder 437 and/or decoder 438 to communicate and receive transmissions in accordance with per band maximum quantities of resource elements. In some implementations, network entity may include or correspond to multiple TRPs of a single base station (e.g., base station 105), to multiple base stations, or any combination thereof.

At 510, the base station 105 transmits configuration information to the UE 115. For example, the base station 105 may transmit a downlink transmission including configuration information. As illustrated in the example of FIG. 5, the base station 105 transmits RRC signaling (e.g., a RRC transmission or message), including the configuration information, to the UE 115.

As described with reference to FIG. 4, the configuration information may include or indicate a transmission type, bandwidth part information (e.g., type, or size), resource block group information, slot type, or a combination thereof. For example, the configuration information may include information about slot configuration details for multiple upcoming slots. The slot type or configuration information may indicate UL slot configurations, downlink configurations, FD configurations, or SBFD configurations (e.g., subband sizes and locations). The downlink transmission may include or correspond to a RRC message, a MAC-CE, DCI, a PDCCH, or a PDSCH.

At 515, the UE 115 may determine the configuration information. For example, the UE 115 may receive and parse the transmission at 510 from the base station 105 to determine the configuration information. The configuration information may include or correspond to the configuration information described with reference to FIG. 4, such as carrier information data 408, spectrum information data 442 or both. To illustrate, the configuration information may include or indicate the slot type information, the transmission type information, the BWP information, the RBG size information, the resource allocation mode information (e.g., Type 0 or Type 1), or a combination thereof.

In some implementations, the UE 115 determines a slot configuration for multiple upcoming slots based on the configuration information, such as slot type information thereof. Determining the slot configuration may include determining a slot type or configuration for multiple slots of a frame.

The UE 115 may optionally determine an active BWP based on the configuration information in some implementations. For example, the UE 115 determines a size and location of the active BWP from one or more configured BWPs. Additionally, or alternatively, the UE 115 determines a RBG size of the active BWP.

At 520, the base station 105 transmits a signaling indication including resource allocation information. For example, the base station 105 may transmit the resource allocation information in a downlink transmission. As illustrated in the example of FIG. 5, the base station transmits DCI including resource allocation information. In other implementations, the base station 105 may transmit a PDCCH, a MAC CE, a RRC, or another type of transmission. The resource allocation information may include or correspond to the resource allocation information described with reference to FIG. 4. For example, the resource allocation information may include or indicate a bitmap for RBG identification or resources using common reference element and an offset.

In some implementations, the base station 105 transmits a signaling indication including scheduling information, such as resource allocation information and/or timing information. The scheduling information may include or correspond to an indication of time and/or frequency information for transmission resources. The timing information may include or corresponding to timing or time domain resource allocation information (e.g., TDRA field) and the resource allocation information may include or correspond to frequency domain resource allocation information (e.g., FDRA field or portion thereof). In some implementations the timing and frequency information of the scheduling information are separate, i.e., in separate fields. In other implementations, the timing and frequency information of the scheduling information may be included in a joint field.

Alternatively, the resource allocation information may indicate a starting resource and a quantity of resources for the particular transmission. To illustrate, the resource allocation information may include or indicate a RIV for a particular BWP, which indicates the starting resource and the quantity of resources for the particular transmission.

At 525, the UE 115 may determine timing information based on receiving the signaling indication at 520 or the configuration information at 510. For example, the UE 115 may receive and parse a signaling indication (signaling transmission) to determine or identify signaling information. The signaling information may include or indicate the scheduling information or a portion thereof, such as the timing information. As illustrated in the example of FIG. 5, the UE 115 receives a DCI including an indication of for a particular transmission and timing information. From timing information (e.g., a TDRA field) the UE 115 determines the slots for the particular transmission. The TDRA field may indicate a slot offset (K0) from the slot where the signaling indication was received. The slot offset may be indicated indirectly through reference to or indication of a particular row in an allocation list (e.g., PDSCH or PUSCH TDRA allocation list).

At 530, the UE 115 may determine the slot configuration information. For example, the UE 115 may determine a slot configuration or slot type for a particular upcoming slot based on the scheduling information and/or the configuration information. Determining the slot configuration may include determining a particular future slot for the future transmission (n+5) based on the timing information (e.g., timing offset, K0) and determine the particular slot configuration (e.g., amount and location of bands/subbands) based on the configuration information, such as based on the slot type information which indicates that particular slot configuration for the indicated slot.

At 535, the UE 115 may determine the resource information. For example, the UE 115 may determine resources for the particular transmission based on the slot configuration of the particular slot and the resource allocation information. Determining the particular resources to be used may include interpreting the resource allocation information based on the slot configuration of the particular slot to determine a transmission bandwidth of the transmission and which resource elements (e.g., RBGs) are included in the transmission bandwidth.

In some implementations, the device (e.g., UE 115 or base station 105) determines an active or effective amount of bits of the resource allocation information, For example, the UE 115 may determine an active or effective amount of bits of the resource allocation information based on the current active BWP and the slot configuration. To illustrate, the UE 115, may determine a total number of bits in the field (e.g., FDRA field) based on conventional methods (RBG size). The UE 115 may then determine the effective (or non-effective) bits of the field based on slot configuration type and BWP type. For example, the UE may determine one or more overlap portions between the active BWP and the corresponding band or subbands (e.g., DL subbands for DL BWP). The UE may determine which RBGs of the BWP correspond to/overlap the corresponding subbands of the slot and find such corresponding bits in the FDRA field.

Determining the effective bits of the resource allocation information (of the field) may include determining a location of the effective bits in the resource allocation information. For example, as the resource allocation information may include or correspond to a bitmap, identifying the bit as effective or not includes identifying the location. As indicated above, effective bits may include or correspond to bits which indicate resource allocation information, such as FDRA information.

After identifying the effective bits, or identifying the non-effective bits, the UE 115 may parse effective bits. For example, the UE 115 may evaluate a value of each effective bit to determine if the effective bit indicates the resources (RBGs) are active for the transmission or not. Based on parsing the effective bits, the UE 115 determines which RBGs are active and included in the transmission bandwidth. The UE 115 may optionally parse the non-effective bits of the resource allocation information (field) to determine one or more other pieces of information.

In other implementations, the device (e.g., UE 115 or base station 105) determines a length of variable length resource allocation information, For example, the UE 115 may determine a quantity of bits of the resource allocation information based on the current active BWP, the slot configuration, and RBG size information. To illustrate, the UE 115, may determine a total quantity of bits in a variable length field for indicating resource allocation information based on an amount of overlap between the active BWP and corresponding subbands of the slot configuration. Depending on how much overlap there is, for example on how many RBGs of the active BWP overlap the corresponding subbands, the UE determines how many bits it needs to map each set of RBGs based on the RBG size. For example, when 24 RBGs of 100 RBGs of the active DL BWP overlap DL subbands, the UE 115 determines the field length is 6 bits when the RBG size is 4. If the RBG size was 8, the field length would be 3 bits. In some implementations, the RBG size may be different from different subbands, thus, a field length may be 4 bits for when a first subband with a first RBG size of 4 overlaps 8 RBGs and a second subband with a second RBG size of 8 overlaps 16 RBGs.

After identifying the field length and determining the mapping of bits to RBGs, the UE 115 may parse the bits of the field. For example, the UE 115 may evaluate a value of each bit to determine if the bit indicates that the corresponding resources (RBGs) are active for the transmission or not. Based on parsing the bits of the field, the UE 115 determines which RBGs are active and included in the transmission bandwidth. As the field is a variable length field, the overhead used to communicate transmission bandwidth is lowered as compared to fixed implementations and is more flexible. Additionally, by reducing an amount of bits, additional information can be included in the signaling message or indication.

At 540, the base station 105 and UE 115 communicate one or more transmissions with each other based on the resource allocation information. For example, the base station 105 and UE 115 may communicate with each other in DL, UL, or FD (e.g., SBFD) based on the transmission bandwidth indicated by the resource allocation information of the signaling message at 520. By utilizing the frequency band, the first maximum quantity of resources can be larger due to utilization/optimization of resource allocation. A larger maximum quantity of resources leads to larger individual allocations/transmission bandwidths, and increased throughput.

As example illustrations, the UE 115 may: 1) transmit the transmission in a first subband and receive the second transmission in a second subband; 2) transmit the transmission in a first subband and transmit the second transmission in a second subband; 3) receive the transmission in a first subband and transmit the second transmission in a second subband; 4) receive the transmission in a first subband and receive the second transmission in a second subband; 5) transmit the transmission in a first subband and a re-transmission of the transmission a second subband, and receive the second transmission in a third subband located between the first and second subband; or 6) transmit the transmission in a first subband and a second subband and receive the second transmission in a third subband located between the first and second subband, all in accordance with the transmission bandwidth and resources indicated by the resource allocation information.

Optionally, the UE 115 and base station 105 may perform one or more additional operations. For example, the base station 105 may transmit a second signaling indication including second scheduling information, such as second resource allocation information. The UE 115 and the base station 105 may perform similar steps 525-540 to commu-nicate one or more second transmissions.

Accordingly, in the example, of FIG. 5, devices of the network may be able to have a more flexible utilization of full-duplex slot configurations through the use a flexible resource allocation information.

Referring to FIG. 6, FIG. 6 is a timing diagram 600 illustrating a wireless communication system that supports enhanced frequency domain resource allocation according to one or more aspects. The example of FIG. 6 may include or correspond to an example of enhanced frequency domain resource allocation for periodic operations and/or multiple devices.

The example of FIG. 6 includes similar devices to the devices described in FIGS. 1, 2, and 4, such as a UE 115, a network entity (e.g., base station 105), and a third wireless communication device (e.g., a network node). The network node may include or correspond to a UE or base station. The devices of FIG. 6 may include one or more of the compo-nents as described in FIGS. 2 and 4. In FIG. 6, these devices may utilize antennas 252a-r, transmitter 410, receiver 412, encoder 413 and/or decoder 414, or may utilize antennas 234a-t, transmitter 434, receiver 436, encoder 437 and/or decoder 438 to communicate and receive transmissions in accordance with per band maximum quantities of resource elements. In some implementations, network entity may include or correspond to multiple TRPs of a single base station (e.g., base station 105), to multiple base stations, or any combination thereof.

At 610, the base station 105 transmits configuration information to the UE 115. For example, the base station 105 may transmit a downlink transmission including configura-tion information. As illustrated in the example of FIG. 6, the base station 105 transmits RRC signaling (e.g., a RRC transmission or message), including the configuration infor-mation, to the UE 115. In some implementations, the con-figuration information includes scheduling information, such as resource allocation information and/or timing infor-mation. The downlink transmission may include or corre-spond to a RRC message, a MAC-CE, DCI, a PDCCH, or a PDSCH The configuration information and the scheduling infor-mation may indicate or include the information described above with reference to FIGS. 4 and 5. Additionally, the resource allocation information and/or timing information may indicate or include the information described above with reference to FIGS. 4 and 5.

At 615, the UE 115 may determine the configuration information. For example, the UE 115 may receive and parse the transmission at 610 from the base station 105 to deter-mine the configuration information as described with refer-ence to 515 of FIG. 5.

In some implementations, the UE 115 determines a slot configuration for multiple upcoming slots based on the configuration information, such as slot type information thereof. Determining the slot configuration may include determining a slot type or configuration for multiple slots of a frame.

The UE 115 may optionally determine an active BWP based on the configuration information in some implemen-tations. For example, the UE 115 determines a size and location of the active BWP from one or more configured BWPs. Additionally, or alternatively, the UE 115 determines a RBG size of the active BWP.

At 620, the UE 115 may determine timing information based on receiving the configuration indication at 610. For example, the UE 115 may receive and parse a periodic grant to determine or identify scheduling information (e.g., peri-odic scheduling information). The periodic scheduling infor-mation may include or indicate the scheduling information for multiple transmissions, such as multiple transmissions over multiple slots. To illustrate, the UE 115 may determine timing information for multiple transmissions, such as by indication of an offset and period for repeating grants and/or transmissions.

At 625, the UE 115 may determine the slot configuration information. For example, the UE 115 may determine a slot configuration or slot type for multiple upcoming slots based on the scheduling information and/or the configuration information. Determining the slot configuration may include determining a particular future slot for a first future trans-mission (n+5) based on the timing information (e.g., timing offset, K0) and determine a corresponding slot configuration (e.g., amount and location of bands/subbands) based on the configuration information, such as based on the slot type information which indicates that particular slot configura-tion for the indicated slot.

At 630, the UE 115 may determine the resource informa-tion. For example, the UE 115 may determine resources for the particular transmission based on the slot configuration of the particular slot and the resource allocation information. Determining the particular resources to be used may include interpreting the resource allocation information based on the slot configuration of the particular slot to determine a transmission bandwidth of the transmission and which resource elements (e.g., RBGs) are included in the trans-mission bandwidth.

In some implementations, the device (e.g., UE 115 or base station 105) determines an active or effective amount of bits of the resource allocation information, For example, the UE 115 may determine an active or effective amount of bits of the resource allocation information based on the current active BWP and the slot configuration. To illustrate, the UE 115, may determine a total number of bits in the field (e.g., FDRA field) based on conventional methods (RBG size). The UE 115 may then determine the effective (or non-effective) bits of the field based on slot configuration type and BWP type. For example, the UE may determine one or more overlap portions between the active BWP and the corresponding band or subbands (e.g., DL subbands for DL BWP). The UE may determine which RBGs of the BWP correspond to/overlap the corresponding subbands of the slot and find such corresponding bits in the FDRA field.

Determining the effective bits of the resource allocation information (of the field) may include determining a location of the effective bits in the resource allocation information.

For example, as the resource allocation information may include or correspond to a bitmap, identifying the bit as effective or not includes identifying the location. As indicated above, effective bits may include or correspond to bits which indicate resource allocation information, such as FDRA information.

After identifying the effective bits, or identifying the non-effective bits, the UE 115 may parse effective bits. For example, the UE 115 may evaluate a value of each effective bit to determine if the effective bit indicates the resources (RBGs) are active for the transmission or not. Based on parsing the effective bits, the UE 115 determines which RBGs are active and included in the transmission bandwidth. The UE 115 may optionally parse the non-effective bits of the resource allocation information (field) to determine one or more other pieces of information.

In other implementations, the device (e.g., UE 115 or base station 105) determines a length of variable length resource allocation information, For example, the UE 115 may determine a quantity of bits of the resource allocation information based on the current active BWP, the slot configuration, and RBG size information. To illustrate, the UE 115, may determine a total quantity of bits in a variable length field for indicating resource allocation information based on an amount of overlap between the active BWP and corresponding subbands of the slot configuration. Depending on how much overlap there is, for example on how many RBGs of the active BWP overlap the corresponding subbands, the UE determines how many bits it needs to map each set of RBGs based on the RBG size. For example, when 24 RBGs of 100 RBGs of the active DL BWP overlap DL subbands, the UE 115 determines the field length is 6 bits when the RBG size is 4. If the RBG size was 8, the field length would be 3 bits. In some implementations, the RBG size may be different from different subbands, thus, a field length may be 4 bits for when a first subband with a first RBG size of 4 overlaps 8 RBGs and a second subband with a second RBG size of 8 overlaps 16 RBGs.

After identifying the field length and determining the mapping of bits to RBGs, the UE 115 may parse the bits of the field. For example, the UE 115 may evaluate a value of each bit to determine if the bit indicates that the corresponding resources (RBGs) are active for the transmission or not. Based on parsing the bits of the field, the UE 115 determines which RBGs are active and included in the transmission bandwidth. As the field is a variable length field, the overhead used to communicate transmission bandwidth is lowered as compared to fixed implementations and is more flexible. Additionally, by reducing an amount of bits, additional information can be included in the signaling message or indication.

At 635, the base station 105 and UE 115 communicate one or more transmissions with each other and/or a third device for a first slot based on the resource allocation information. For example, the UE 115 may communicate with the base station 105 and/or the third device in DL, UL, or FD (e.g., SBFD) based on the transmission bandwidth indicated by the resource allocation information of the signaling message at 620. By utilizing the frequency band, the first maximum quantity of resources can be larger due to utilization/optimization of resource allocation. A larger maximum quantity of resources leads to larger individual allocations/transmission bandwidths, and increased throughput.

As example illustrations, the UE 115 may: 1) transmit the transmission in a first subband and receive the second transmission in a second subband; 2) transmit the transmission in a first subband and transmit the second transmission in a second subband; 3) receive the transmission in a first subband and transmit the second transmission in a second subband; 4) receive the transmission in a first subband and receive the second transmission in a second subband; 5) transmit the transmission in a first subband and a re-transmission of the transmission a second subband, and receive the second transmission in a third subband located between the first and second subband; or 6) transmit the transmission in a first subband and a second subband and receive the second transmission in a third subband located between the first and second subband, all in accordance with the transmission bandwidth and resources indicated by the resource allocation information.

At 640, the base station 105 and UE 115 communicate one or more transmissions with each other and/or a third device for a second slot based on second resource allocation information. For example, the UE 115 may communicate with the base station 105 and/or the third device in DL, UL, or FD (e.g., SBFD) based on a second transmission bandwidth indicated by the second resource allocation information.

In some implementations, the second resource allocation information may be the same as the resource allocation information for the first slot and first transmission. In other implementations, the second resource allocation information may be different from the resource allocation information for the first slot and first transmission. When the resource allocation information and the second resource allocation information are the same, the transmission bandwidth and the second transmission bandwidth may still be different. For example, as the same bit value, length and placement in a FDRA field may result in different interpretations based on different slot configurations, different BWPs, and different RBG size. To illustrate, changing an active BWP for the second slot and second transmission may adjust the transmission bandwidth and which RBGs are used.

Optionally, the UE 115 and base station 105 may perform one or more additional operations. For example, the base station 105 may transmit second configuration information or a signaling indication including second scheduling information, such as third resource allocation information. The UE 115 and the base station 105 may perform similar steps 620-640 to communicate one or more third transmissions for the third resource allocation information.

Accordingly, in the example, of FIG. 6, devices of the network may be able to have a more flexible utilization of full-duplex slot configurations through the use a flexible resource allocation information.

In some implementations, a device may generate or interpret (e.g., parse) the resource allocation information differently based on slot information, such as slot configuration information. For example, a UE may interpret a field or bitmap differently based on a configuration of the slot, such as DL, UL, or FD (e.g., SBFD).

Figures 7A, 7B, 7C:
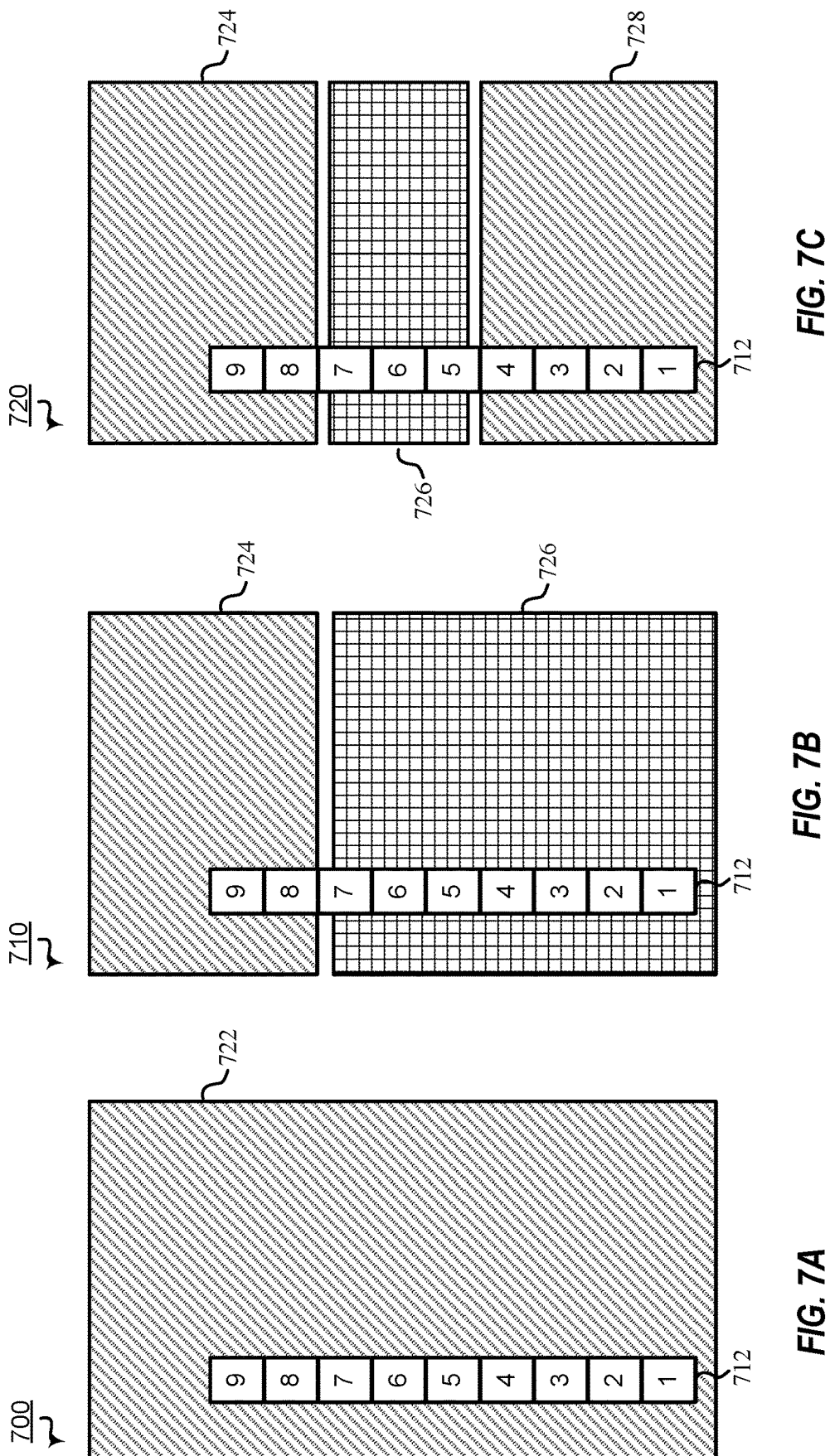
FIGS. 7A-7C are slot diagrams illustrating an example resource allocation according to one or more aspects.

Examples of interpreting resources allocation differently based on slot configuration information are illustrated in FIGS. 7A-7C. FIGS. 7A-7C each illustrate a transmission band (or band for short) for a particular slot, which represents a channel bandwidth for a duration of a slot. FIGS. 7A-7C further illustrate a visual representation of a configured (e.g., active) BWP overlaid on the transmission band of the slot. A slot or transmission band as in FIGS. 7A-7C may include one or more subbands, and the BWP may overlap at least a portion of one or more of the subbands thereof. In FIGS. 7A-7C, a device may generate or interpret the same resource allocation of a bitmap differently based on the different slot configurations (e.g., different layouts, placement, sizes, and parameters, such as RBG size, of the slot). As an illustrative example, a field having 9 bits where each bit has a value of 1 (111111111) can be interpreted differently for the different slot configurations (e.g., subband configurations) of FIGS. 7A-7C. As described herein, the slot configuration corresponds to a location and size of subbands in a slot, and optionally, a corresponding RBG size.

Referring to FIG. 7A, a band 700 having a first slot configuration is illustrated. The first slot configuration may be referred to as DL or DL only configuration. The first slot configuration has a single DL band 722 which spans the length of the band 700/slot. An active BWP, BWP 712, is illustrated overlapping a portion of the band 700.

The BWP 712 may be a DL BWP, an UL BWP, or a joint (UL/DL) BWP. As an illustrative example, the BWP 712 is a DL BWP; and the DL BWP entirely falls within the DL band 722. Thus, for the DL BWP, the device may determine that the effective length of the resource allocation and/or the FDRA field is all 9 bits. That is, the DL BWP completely overlaps (e.g., is completely within a downlink bandwidth (DL band or subband)).

As an illustrative example, a device may receive a resource allocation of 9 bits where each bit corresponds to one or more RBGs. A bit value of zero means that the corresponding RBG or RBGs are not allocated for transmission and a bit value of 1 means that the corresponding RBG or RBGs are allocated for transmission.

In the above example, each of the 9 bits convey information no matter whether an RBG is allocated or not by the bit value because the 9 bits correspond to the BWP which is entirely falling within the DL subband. The effective length of the FDRA is then determined by the number of bits that actually convey information, referred to as active bits.

Referring to FIG. 7B, a band 710 having a second slot configuration is illustrated. The second slot configuration may be referred to as mixed configuration or SBFD. The second slot configuration has a single DL subband 724 and a single UL subband 726 in the band 710/slot. An active BWP, BWP 712, is illustrated overlapping a portion of each subband.

Similar to FIG. 7A, the BWP 712 of FIG. 7B may be a DL BWP, an UL BWP, or a joint (UL/DL) BWP. As an illustrative example, the BWP 712 is a DL BWP; and a portion of the DL BWP overlaps a portion of the DL subband 724. When the BWP partially overlap with the DL subband like in FIG. 7B or 7C, each bit of the resource allocation may not be entirely useful or convey FDRA information. In an example, with 9 bits conveying allocation in a scenario where the DL BWP partially overlaps with the DL subband (s), each bit conveys information only if the corresponding RBG or RBGs overlap even partially with the DL sub-bands. Otherwise, this bit may not convey any information regardless of its value and may be ignored by the UE. These bits that don't convey information may still correspond to certain RBGs but the UE may safely assume that these RBGs will never be allocated for transmission regardless of the value of these bits that don't convey any information. The effective length of the FDRA is not determined by the number of bits that do not actually convey information, referred to as inactive bits.

Referring to FIG. 7C, a band 720 having a third slot configuration is illustrated. The third slot configuration may be referred to as mixed configuration or SBFD. The third slot configuration has two DL subbands 724 and 728, separated by, a single UL subband 726 in the band 720/slot. An active BWP is illustrated overlapping a portion of each subband.

Similar to FIGS. 7A and 7B, the BWP 712 of FIG. 7C may be a DL BWP, an UL BWP, or a joint (UL/DL) BWP. As an illustrative example, the BWP 712 is a DL BWP; and a portion of the DL BWP overlaps portions of both DL subbands 724 and 728. Thus, for the DL BWP, the device may determine that the effective length of the resource allocation and/or the FDRA field is a portion of bits of the FDRA field which correspond to the portion of the DL BWP that overlaps the DL subbands 724 and 728. The active bits are the bits that convey information while the inactive bits are the bits that don't convey information.

In the example, of FIG. 7C, the effective length of the resource allocation and/or the FDRA field is 6 of the 9 bits, i.e., the first 4 bits and the last 2 bits of a 9 bit field in the DL example. These first 4 bits and the last 2 bits correspond to active bits where the BWP 712 (DL BWP in this case) overlaps each of the DL subbands 724 and 728. Alternatively, if the BWP 712 were an UL BWP, the device may determine that the effective length of the resource allocation and/or the FDRA field is 3 of the 9 bits. The location of the active bits in this example correspond to the location where the BWP 712 (UL BWP in this case) overlaps the UL subband 726, that is the three bits of bit positions four through six.

Thus, as illustrated in FIGS. 7A-7C the same resource allocation information (e.g., i.e., bitmap and/or field with same number of bits and exact same value) may be interpreted differently based on the actives bits of the resource allocation, where the active bits are determined based on the BWP 712, the band (700, 710, or 720), or RBG size.

Figure 8B:
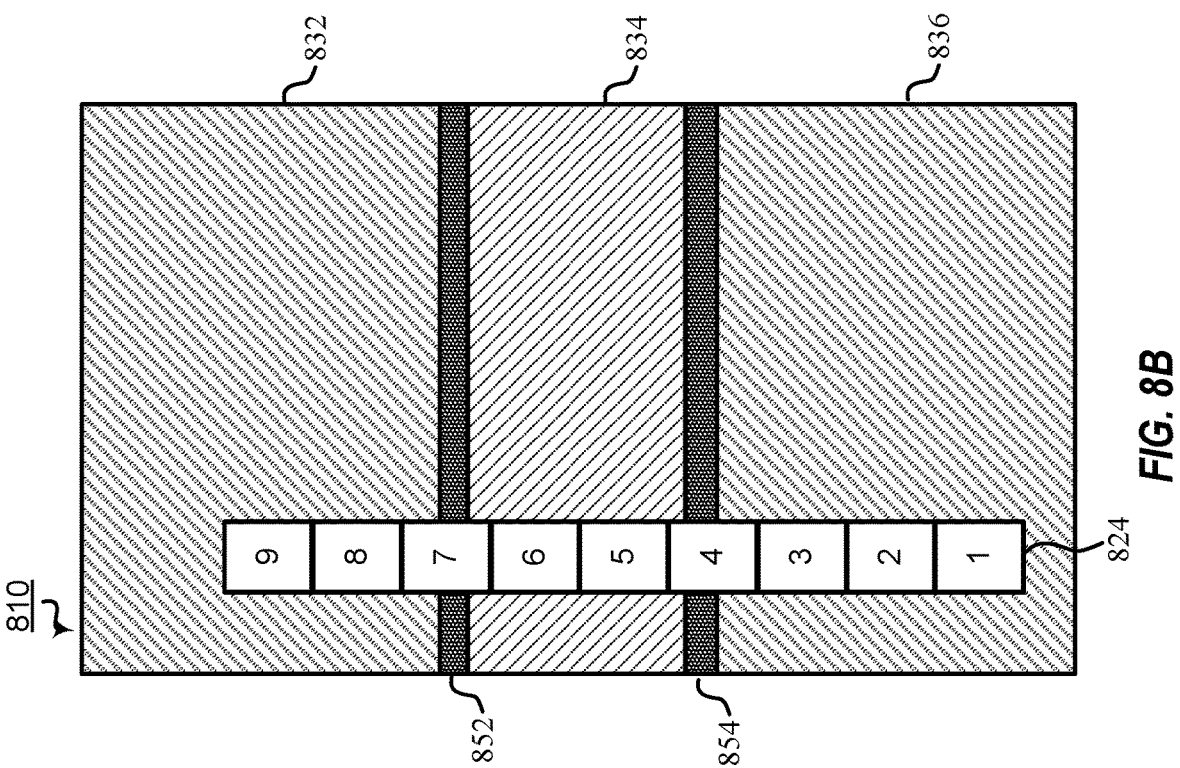
FIGS. 8A and 8B are slot diagrams illustrating an example resource allocation according to one or more aspects.
Figure 8A:
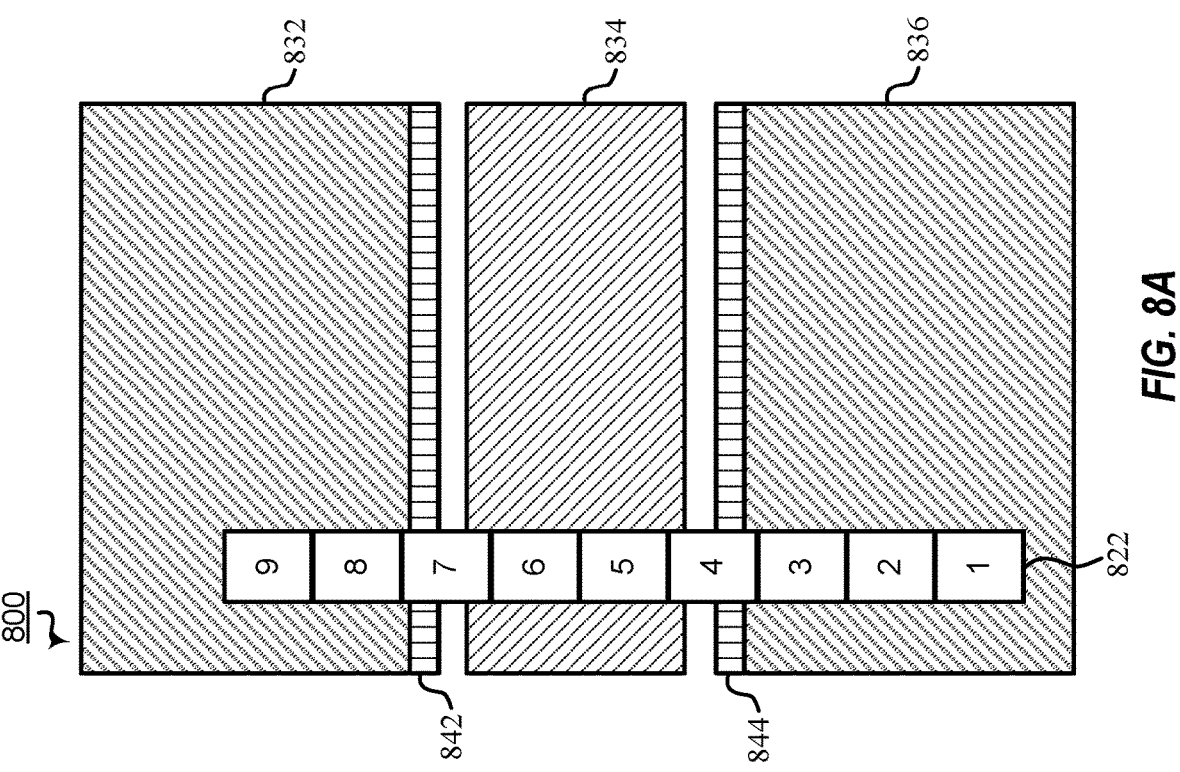

In the examples of FIGS. 7A-7C, each bit of the bitmap corresponds to a RBG group which fully overlaps (i.e., does not partially overlap) a bandwidth of the corresponding band or subband. In other examples, such as shown in FIGS. 8A-8B, one or more bits of the bitmap may correspond to a RBG group which only partially overlaps a bandwidth of the corresponding band or subband. That is, the RBG may overlap both the bandwidth of the corresponding band or subband and overlaps either a bandwidth of a guardband or a bandwidth of a non-corresponding band or subband. A corresponding band or subband corresponds to a band where the BWP 712 is configured to transmit in that direction, such as a DL BWP and a DL subband, a joint BWP and any subband, etc. A non-corresponding band or subband corresponds to a band where the BWP 712 is not configured to transmit in that direction, such as a DL BWP and a UL subband, a UL BWP and DL subband, a joint BWP and a guardband, etc.

FIGS. 8A and 8B illustrate overlap transmission examples, that is where a RBG represented by a bit of the bitmap partially overlaps a corresponding subband. In such examples, one or more RBs of the RBG may be outside of a corresponding subband. For example, a RBG corresponding to bit 4 and a RBG corresponding to bit 7 partially overlap the DL subbands (and UL subband) in the examples of FIGS. 8A and 8B. Depending on a mode or setting, devices of the network may treat such situations differently, such as interpret the resource allocation information differently. For example, overlapping RB Gs may not be allocated or transmitted in some implementations. In other implementations, only the overlapping part with the transmission band is allocated, such as a top portion of RBs of the RBG corresponding to bit 7 and a bottom portion of RBs of the RBG corresponding to bit 4 for DL BWPs.

Referring to FIG. 8A, a band 800 having a fourth slot configuration with RBG overlap is illustrated. The fourth slot configuration may be referred to as mixed configuration or SBFD. The fourth slot configuration has two DL subbands 832 and 836, separated by, a single UL subband 834 in the band 800/slot. An active BWP, BWP 822, is illustrated overlapping a portion of each subband.

In the example of FIG. 8A, the effective length of the resource allocation and/or the FDRA field for the BWP 822 in DL is 5 of the 9 bits when no overlaps are allowed (as shown by bars 842 and 844 with vertical stripes), i.e., the first 3 bits and the last 2 bits of a 9 bit field. The device may parse this received resource allocation based on the active bits for FDRA information where the DL BWP partially overlaps with the DL subband(s). Each bit in the resource allocation conveys information only if the corresponding RBG or RBGs overlap even partially with the DL sub-bands.

Referring to FIG. 8B, another example of interpreting the fourth slot configuration with RBG overlap is illustrated. As illustrated in FIG. 8B, the slot configuration of band 810 is the same as band 800 of FIG. 8A. However, in some operating modes or with some configuration settings, devices may interpret that an overlapping portion of an RBG can be transmitted (i.e., the bars 842 and 844 with vertical stripes have been removed from the ends of the DL subbands 832 and 836). Thus, the effective length of the resource allocation and/or the FDRA field the BWP 822 in DL is 7 of the 9 bits, i.e., the first 4 bits and the last 3 bits of a 9 bit field. The device may parse this received resource allocation based on the active bits for FDRA information where the DL BWP partially overlaps with the DL subband(s). Each bit in the resource allocation conveys information only if the corresponding RBG or RBGs overlap even partially with the DL sub-bands.

As compared to the effective length of the resource allocation FIG. 8A, the effective length of the resource allocation in FIG. 8B is longer because overlaps are enabled or allowed. Specifically, the effective length of the resource allocation in FIG. 8B has more active bits (e.g., 7 active bits as compared to 5 active bits). Although the effective length of the resource allocation is longer for FIG. 8B, the devices may only communicate the overlapped portion of the over-lapped bits (e.g., bit positions 3 and 6, that is only transmit RBs or RBGs which fall in the DL subbands 832 and 836 (previously occupied by the bars 842 and 844 in FIG. 8A).

Guardbands 852 and 854 are also illustrated in FIG. 8B between the DL subbands 832 and 836 and the UL subband 834. Although not illustrated in the other figures for sim-plicity, guardbands (e.g., guardbands 852 and 854) may be used in any of the other implementations between two subbands and/or between channels or bands. When trans-mitting the overlapping portion of RBs, the device may not transmit RBs which overlap a guardband.

Figures 9A, 9B:
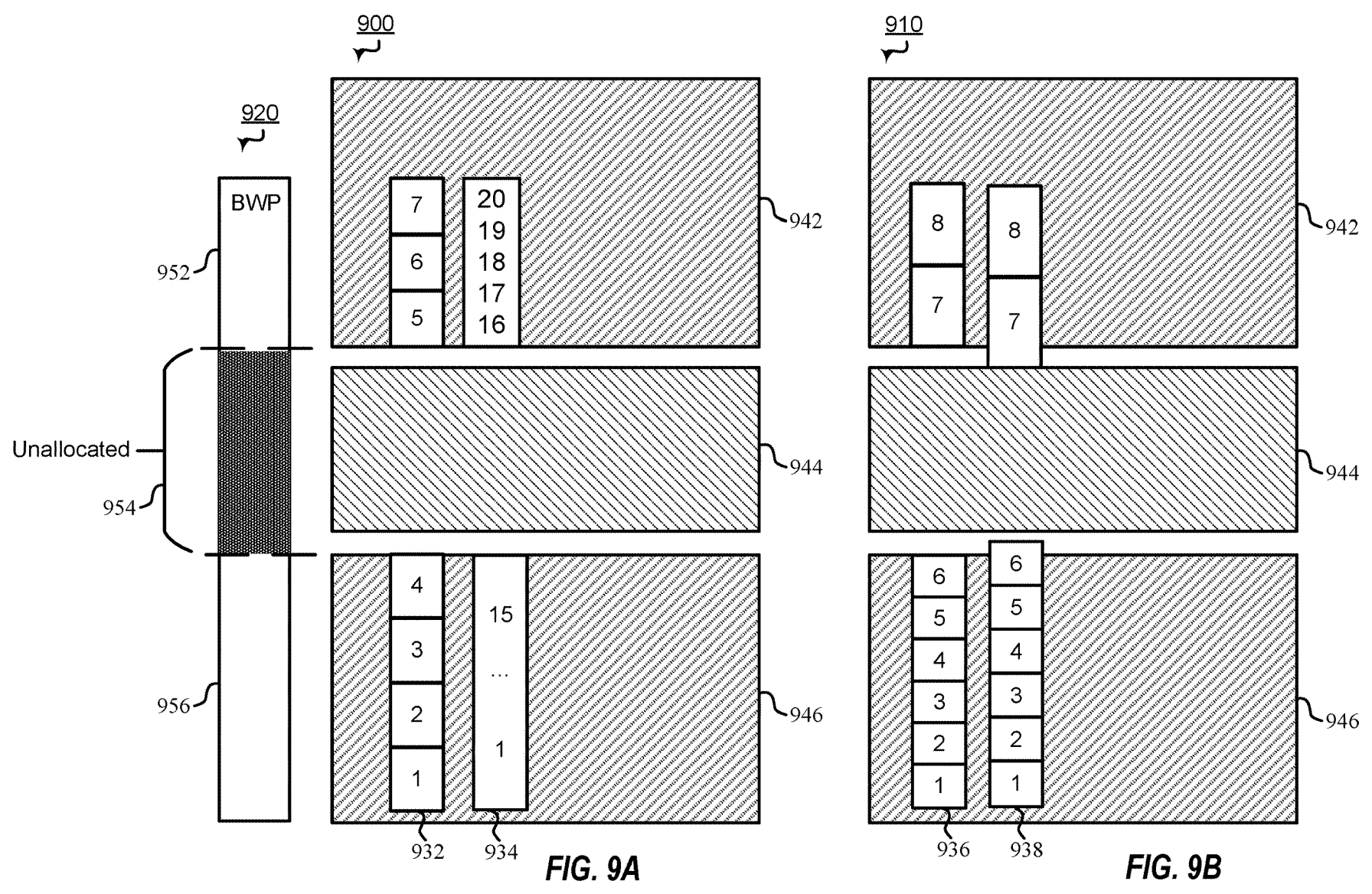

FIGS. 9A and 9B illustrate transmission examples of a variable length resource indication. For example, the FDRA field may be a variable length field having a quantity of bits that correspond only to overlap portions between the BWP and subbands of a slot configuration. To illustrate, not possible or allocated RBGs, RBGs of the BWP that do not overlap a corresponding subband (i.e., RBGs which overlap a guardband or non-corresponding subband) are excluded from representation in the bitmap. Thus, the bitmap size can be reduced or increased accordingly to the size of the actual potentially assignable RBGs for the given combination of BWP and corresponding subbands of the slot configuration.

Referring to FIG. 9A, a band 900 having a fifth slot configuration with RBG overlap is illustrated. The fifth slot configuration may be referred to as mixed configuration or SBFD. The fifth slot configuration has two DL subbands 942 and 946, separated by, a single UL subband 944 in the band 900/slot.

FIG. 9A illustrates another example of interpretation of a bitmap for BWP resource allocation, variable field length allocation. Currently, a FDRA field can have 9 or 18 bits. However, it is not a variable length field, i.e., a field that can have other lengths (numbers of bits) determined based on a set of variables/inputs. In the example of FIG. 9A, the length of the field or bitmap itself can be 1 to n bits, where n is greater than 18. Rather than effective bits and ineffective bits/reserve bits as in the examples of FIGS. 7A-8B, the bitmap length itself can depend on how many bits are needed to convey the information. Thus, in the above examples, the FDRA field/bitmap would be 9 bits long for FIG. 7A, 2 bits long for FIG. 7B, 5 bits long for FIG. 7C, 5 bits long for FIG. 8A, and 7 bits long for FIG. 8B for a DL BWP as illustrated.

To illustrate, a BWP 920 (reference BWP) is illustrated in FIG. 9A. The BWP 920 may be broken into sections which overlap respective subbands and where a transmission may be possible. As illustrated in the example of FIG. 9A, BWP 920 has three sections, a first section 952, a second section 954, and a third section 956. When the BWP 920 corre-sponds to a DL BWP or a DL/UL BWP, the BWP 920 may be able to indicate transmissions which occur in a first downlink subband 942 and a second downlink subband 946. In such implementations, the BWP 920 may not be able to indicate transmissions which occur in an uplink subband, such as uplink subband 944. Thus, the portion of the BWP, such as the second section 954, may be unallocated or unassignable for certain slot configurations. Rather than include such bits in a field for indicating transmission resources and bandwidth as non-resource allocation infor-mation or bits, they can be removed from the field alto-gether, to reduce the field and length of the transmission or message. When interpreting the resource allocation infor-mation, device may determine a length of the resource allocation information (quantity of bits) based on only the corresponding sections where the BWP 920 overlaps corre-sponding subbands (942 and 946), such as sections 952 and 956. The device may determine a length of the resource allocation information (quantity of bits) independent of overlaps between the BWP 920 and non-corresponding subbands (944), such as section 954.

In the example of FIG. 9A, a first bitmap 932 correspond-ing to the BWP 920 is 7 bits long and a second bitmap 934 corresponding to the BWP 920 is 20 bits long. The first bitmap 932 has 4 bits in a bottom subband (third DL subband 946) and 3 bits in a top subband (first DL subband 942), and each bit represents the same quantity of RBs or RBGs (has a same RBG size). The second bitmap 934 has 15 bits in the bottom subband (third DL subband 946) and 5 bits in the top subband (first DL subband 942), and each bit represents the same quantity of RBs or RBGs (has a same RBG size).

Referring to FIG. 9B, another example of interpreting the fifth slot configuration of FIG. 9A is illustrated. As illus-trated in FIG. 9B, the slot configuration of band 910 is the same as band 900 of FIG. 9A. In the example of FIG. 9B, a first bitmap 936 corresponding to the BWP 920 is 8 bits long and a second bitmap 938 corresponding to the BWP 920 is 8 bits long. The first bitmap 936 has 6 bits in a bottom subband (third DL subband 946) and 2 bits in a top subband (first DL subband 942), and bits in the top subband represent more RBs or RBGs (has a larger RBG size). The second bitmap 938 has 6 bits in the bottom subband (third DL subband 946) and 2 bits in the top subband (first DL subband 942), and bits in the top subband represent more RBs or RBGs (has a larger RBG size). As compared to the first bitmap 936, the second bitmap 938 is represents a BWP (e.g., 920) which has bits which only partially overlap the DL subbands 942 and 946. In some implementations, those bits and RBGs may not be transmitted, and in other implementations, only the overlapping RBs may be transmitted, as described with reference to FIG. 8B.

The number of bits in the FDRA field in the scheduling DCI is given by the total number of RBGs that overlap either fully or partially with the subband divided by the RBG size. If every subband has a different RBG size, the total number of bits transmitted in the FDRA is:

$$\Sigma_{SB=0}^{n} \frac{\text{\# of } RBGs \text{ in } BWP \text{ overrllaping with } SB}{RBG \text{ size of } SB}.$$

Figure 12:
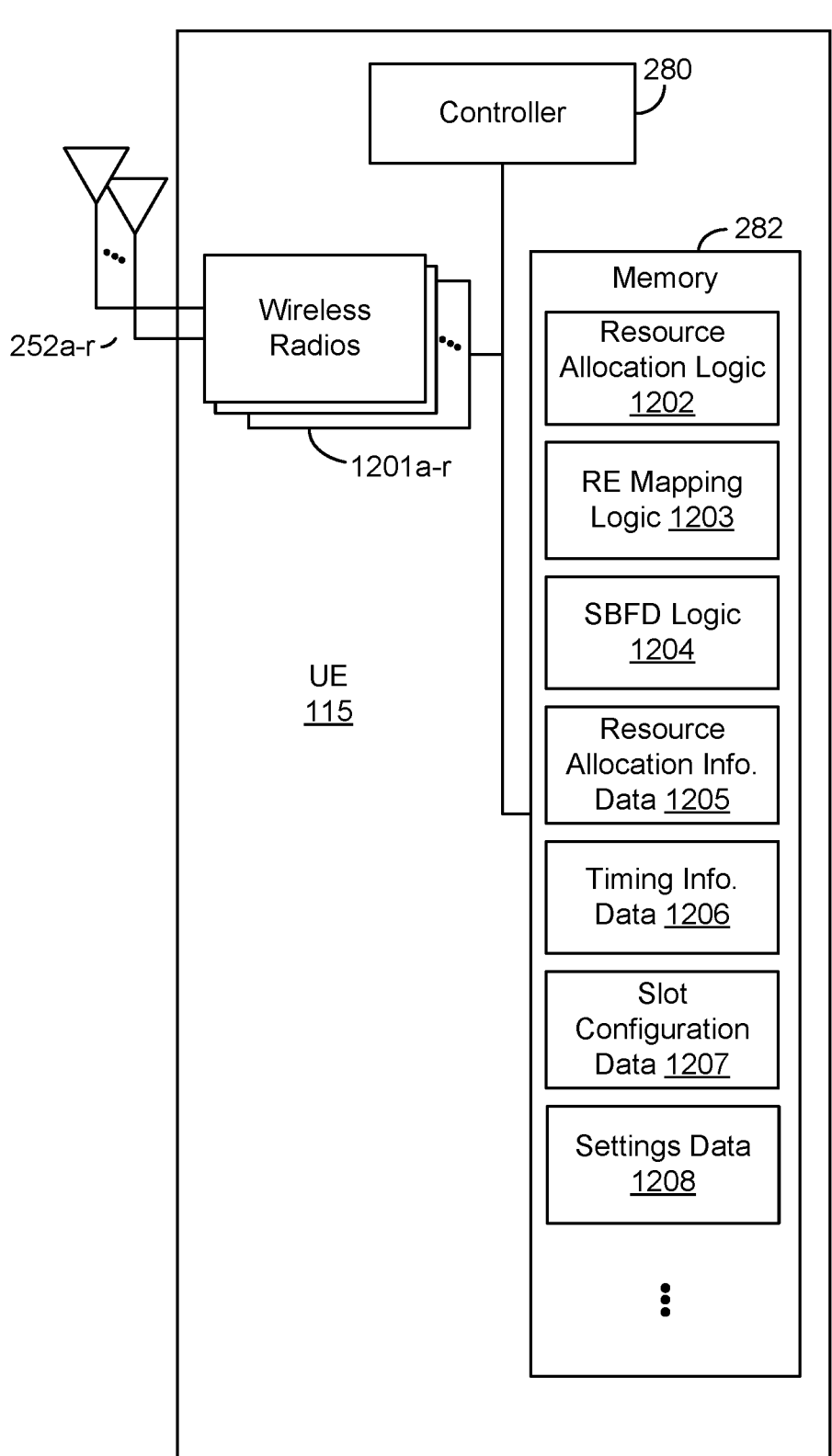
FIG. 12 is a block diagram of an example UE that supports enhanced frequency domain resource allocation according to one or more aspects.

FIG. 10 is a flow diagram illustrating example blocks executed by a wireless communication device (e.g., a UE or base station) configured according to an aspect of the present disclosure. The example blocks will also be described with respect to UE 115 as illustrated in FIG. 12. FIG. 12 is a block diagram illustrating UE 115 configured according to one aspect of the present disclosure. UE 115 includes the structure, hardware, and components as illustrated for UE 115 of FIGS. 2 and/or 4. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1201a-r and antennas 252a-r. Wireless radios 1201a-r includes various components and hardware, as illustrated in FIG. 2 for UE 115, including modulator/demodulators 254a-r, MIMO detector 256, receive processor 258, transmit processor 264, and TX MIMO processor 266. As illustrated in the example of FIG. 12, memory 282 stores resource allocation logic 1202, resource element mapping logic 1203, SBFD logic 1204, resource allocation information data 1205, timing information data 1206, slot configuration data 1207, and settings data 1208. The data (1202-1208) stored in the memory 282 may include or correspond to the data (406, 408, 442, and/or 444)l stored in the memory 404 of FIG. 4.

At block 1000, a wireless communication device, such as a UE, receives resource allocation information including a quantity of bits that corresponds to a transmission bandwidth for a transmission. For example, the UE (e.g., UE 115) may receive the resource allocation information 454 from another device (e.g., a base station 105 or a second UE 403). As described above, the resource allocation information may include or correspond to a bitmap which indicates FDRA information.

The resource allocation information may be received in a transmission or message that includes or include or correspond to the configuration transmission 450 of FIG. 4, the configuration message 452 of FIG. 4, the signaling message of FIG. 4, the DCI of FIG. 5, or the RRC of FIG. 6. To illustrate, a receiver (e.g., receiver processor 258 or receiver 412) of the UE 115 receives resource allocation information 454 from the base station 105 via wireless radios 1201a-r and antennas 252a-r which each includes at least a portion of the scheduling information. As other examples, resource allocation information 454 may be received in a transmission or message that includes or include or correspond to the configuration transmissions and/or signaling transmission as described with reference to FIGS. 4-6.

At block 1001, the UE communicates, based on the quantity of bits, with a second network node using the transmission bandwidth for the transmission. For example, the UE 115 may transmit or receive at least one transmission of the transmissions 456 to another UE, such as second UE 403, or to a network device, such as base station 105. The first transmission may include or correspond to one or more of the transmissions 456 of FIG. 4, or one or more of uplink or downlink transmissions, as described with reference to FIG. 5 or 6.

When the UE receives the first transmission, the UE 115 may receive, based on the resource allocation information, a downlink transmission or a sidelink transmission. To illustrate, a receiver (e.g., receiver processor 258 or receiver 412) of the UE 115 receives the first transmission 456 via wireless radios 1201a-r and antennas 252a-r using the transmission bandwidth for the transmission.

When the UE transmits the first transmission, the UE 115 may transmit, based on the resource allocation information, an uplink transmission or a sidelink transmission. To illustrate, a transmitter (e.g., transmit processor 264 or transmitter 410) of the UE 115 transmits the first transmission 456 via wireless radios 1201a-r and antennas 252a-r using the transmission bandwidth for the transmission.

The wireless communication device (e.g., UE or base station) may execute additional blocks (or the wireless communication device may be configured further perform additional operations) in other implementations. For example, the wireless communication device (e.g., the UE 115) may perform one or more operations described above, such as described with reference to FIGS. 4-7. As another example, the wireless communication device (e.g., the UE 115) may perform one or more aspects as presented below.

In a first aspect, the network node further receives slot type information; and interprets the resource allocation information based on the slot type information, wherein the transmission bandwidth for the transmission is based on the interpretation of the resource allocation information.

In a second aspect, alone or in combination with the first aspect, the resource allocation information corresponds to a bitmap for resource element information of an active bandwidth part (BWP).

In a third aspect, alone or in combination with one or more of the above aspects, the interpretation is indicative of which resource elements of the active BWP are active or assigned for the transmission.

In a fourth aspect, alone or in combination with one or more of the above aspects, the interpretation is indicative of which bits of the bitmap of the active BWP are assignable for the transmission.

In a fifth aspect, alone or in combination with one or more of the above aspects, the network node further: receives timing information (e.g., TDRA); and determines a slot based on the timing information, where interpreting the resource allocation information includes interpreting the resource allocation information based on a slot configuration for the slot, and the slot configuration is based on the slot type information and the timing information.

In a sixth aspect, alone or in combination with one or more of the above aspects, the network node further: determines, for each of a first subband, a second subband, and a third subband, a respective location, a respective size, a respective type, and a respective RBG size based on the slot configuration; determines whether an active bandwidth part (BWP) overlaps at least a portion of each of the first subband, the second subband, or the third subband; determines, based on the determination of whether the active BWP overlaps at least the portion of each of the first subband, the second subband, or the third subband, which resource block groups of the active BWP overlap at least the portion of the first subband, the second subband, or the third subband; and determines a decoding bitmap based on the determination of which of the resource block groups of the active BWP overlap at least the portion of the first subband, the second subband, or the third subband, wherein the resource allocation information is interpreted based on the decoding bitmap to identify the quantity of bits.

In a seventh aspect, alone or in combination with one or more of the above aspects, a total quantity of bits of the decoding bitmap corresponds to a total quantity of RBGs of the active BWP, and wherein a quantity and location of decoding bits of the decoding bitmap correspond to a quantity of overlapping RBGs between the active BWP and the first subband, the second subband, or the third subband, wherein the resource allocation information corresponds to a bitmap for RBGs of the active BWP, and wherein the decoding bits of the decoding bitmap are used to identify the quantity of bits that corresponds to the transmission bandwidth for the transmission.

In an eighth aspect, alone or in combination with one or more of the above aspects, the network node further: determines, for each of a first subband, a second subband, and a third subband, a respective location, a respective size, a respective type, and a respective RBG size based on the slot configuration; determines whether an active bandwidth part (BWP) overlaps at least a portion of each of the first subband, the second subband, or the third subband; determines, based on the determination of whether the active BWP overlaps at least the portion of each of the first subband, the second subband, or the third subband, which resource block groups of the active BWP overlap at least the portion of the first subband, the second subband, or the third subband; and determines a length of a variable length field which includes the resource allocation information based on the determination of which of the resource block groups of the active BWP overlap at least the portion of the first subband, the second subband, or the third subband, wherein the length of the variable length field corresponds to a quantity of overlapping RBGs between the active BWP and the first subband and the third subband, and wherein the length of the variable length field corresponds the quantity of bits.

In some such aspects, the interpretation results in a first interpretation of the resource allocation information for a first slot configuration, and wherein the interpretation results in a second interpretation of the resource allocation information for a second slot configuration different from the first slot configuration.

In some such aspects, the first interpretation has a different quantity of effective/active bits or a different location/order of effective/active bits.

In some such aspects, the first slot configuration is a first SBFD slot configuration, and wherein the second slot configuration is a second SBFD slot configuration, an uplink slot configuration, or a downlink slot configuration.

In a ninth aspect, alone or in combination with one or more of the above aspects, to communicate with the second network node, the network node: transmits the transmission; or receives the transmission.

In a tenth aspect, alone or in combination with one or more of the above aspects, to communicate with the second network node, the network node communicates in a full duplex manner with the second network node.

In an eleventh aspect, alone or in combination with one or more of the above aspects, to communicate in the full duplex manner with the second network node, the network node: transmits or receives the transmission and receives a second transmission in a subband full duplex manner.

In some such aspects, the subband full duplex manner may include to: transmit the in a first subband and receive the second transmission in a second subband; receive the transmission in a first subband and transmit the second transmission in a second subband; transmit the transmission in a first subband and a third transmission (e.g., re-transmission of the transmission) a second subband, and receive the second transmission in a third subband located between the first and second subband; or transmit the transmission in a first subband and a second subband and receive the second transmission in a third subband located between the first and second subband.

In a twelfth aspect, alone or in combination with one or more of the above aspects, the transmission occurs in a slot with a subband full duplex configuration. For example, the transmission occurs in a SBFD slot type, such as a slot with at least one DL subband and at least one UL subband.

In a thirteenth aspect, alone or in combination with one or more of the above aspects, the quantity of bits corresponds to effective bits of a frequency domain resource allocation (FDRA) field.

In some such aspects, effective bits are bits that indicate FDRA information or bits of the bitmap of RBG info for the active BWP or effective bits are bits which correspond to RBGs of the active BWP which overlap the transmission band/multiple subbands.

In a fourteenth aspect, alone or in combination with one or more of the above aspects, the quantity of bits corresponds to a total quantity bits of an FDRA field.

In a fifteenth aspect, alone or in combination with one or more of the above aspects, the resource allocation information includes a first set of bits that indicate FDRA information and a second set of bits that indicate non-FDRA information. The second set of bits that indicate the non-FDRA information may include or correspond to reserve bits which can be allocated to another function at a later time.

In a sixteenth aspect, alone or in combination with one or more of the above aspects, the resource allocation information includes an FDRA field, wherein the FDRA field includes the first set of bits and the second set of bits.

In a seventeenth aspect, alone or in combination with one or more of the above aspects, the network node further determines the resource allocation information based on a slot type for the transmission or a transmission type of the transmission. For example, the network node may identify a type of SBFD or how many subbands there are and where the subbands are positioned.

In an eighteenth aspect, alone or in combination with one or more of the above aspects, the resource allocation information corresponds to at least a portion of an FDRA field, and the network node further determines a first set of bits of the FDRA field based on the slot type or the transmission type, where the first set of bits indicate FDRA information, and the FDRA field includes a second set of bits that indicate non-FDRA information.

In a nineteenth aspect, alone or in combination with one or more of the above aspects, the network node further: receives slot type information; and determines the transmission bandwidth for the transmission based on effective bits of an FDRA field, wherein the effective bits of the FDRA field indicate FDRA information and are based on the slot type information, and wherein the resource allocation information includes or corresponds to the effective bits.

In a twentieth aspect, alone or in combination with one or more of the above aspects, to determine the transmission bandwidth based on the effective bits of the FDRA field, the network node determines the transmission bandwidth for the transmission based on a quantity of the effective bits.

In a twenty-first aspect, alone or in combination with one or more of the above aspects, the resource allocation information corresponds to a bitmap for resource element information of an active bandwidth part (BWP), and wherein the BWP is a downlink (DL) BWP, an uplink (UL) BWP, or an UL/DL BWP. The UL/DL BWP may include or correspond to a joint BWP which can be assigned or used for Uplink only or downlink only. Alternatively, the active BWP can be a full-duplex BWP which can assign uplink and downlink resources in a single slot.

In a twenty-second aspect, alone or in combination with one or more of the above aspects, each bit of the bitmap corresponds to a respective resource block group (RBG) of the active BWP, wherein a particular RBG for a particular bit of the bitmap partially overlaps with a transmission band for the transmission, and wherein the particular RBG is not allocated or transmitted.

In a twenty-third aspect, alone or in combination with one or more of the above aspects, each bit of the bitmap corresponds to a respective RBG of the active BWP, wherein a particular RBG for a particular bit of the bitmap partially overlaps with a transmission band for the transmission, wherein a first portion of the corresponding RBG is allocated and transmitted and a second portion of the corresponding RBG is not allocated or transmitted, and wherein the first portion corresponds to resource blocks of the particular RBG which fully overlap the transmission band. In some such aspects the FDRA field is 9 or 18 bits long.

In a twenty-fourth aspect, alone or in combination with one or more of the above aspects, the quantity of bits corresponds to a total quantity bits of a frequency domain resource allocation (FDRA) field, where the total quantity of bits is based on: a quantity of resource block groups that overlap one or more corresponding subbands of a slot of the transmission, and an RBG size.

In a twenty-fifth aspect, alone or in combination with one or more of the above aspects, the RBG size indicates a quantity of RBs in each RBG, and wherein the total quantity of bits in the FDRA field is the number of RBGs that at least partially overlap with any of the subbands divided by the quantity of RBs in each RBG. In some such aspects, the FDRA field is not 9 or 18 bits, such as longer than 18 bits or shorter than 9 bits.

In a twenty-sixth aspect, alone or in combination with one or more of the above aspects, a band corresponding to the transmission has two subbands for a particular transmission mode, such as uplink or downlink.

In a twenty-seventh aspect, alone or in combination with one or more of the above aspects, a band corresponding to the transmission has multiple subbands, and wherein a first subband of the multiple subbands has a first RBG size and a second subband of the multiple subbands has a second RBG size different from the first RBG size.

In a twenty-eighth aspect, alone or in combination with one or more of the above aspects, a total number of bits of the transmission is a sum a first quantity of bits that corresponds to a first quantity of RBGs in a BWP overlapping with the first subband divided by the first RBG size of the first subband and of a second quantity of bits that corresponds to a second quantity of RBGs in the BWP overlapping with the second subband divided by the second RBG size of the second subband.

In a twenty-ninth aspect, alone or in combination with one or more of the above aspects, the network node further: receives slot type information and resource element size information; determines a length of an FDRA field based on the slot type information and the resource element size information, wherein the resource allocation information corresponds to the FDRA field; and determines the transmission bandwidth for the transmission based on the length of the FDRA field. Resource element size information may include RB size information or RBG size information.

In a thirtieth aspect, alone or in combination with one or more of the above aspects, to determine the transmission bandwidth based on the length of the FDRA field, the network node determines the transmission bandwidth for the transmission based on a quantity of bits of the FDRA field which have a particular value.

In a thirty-first aspect, alone or in combination with one or more of the above aspects, the resource allocation information corresponds to a bitmap for resource element information of an active BWP, and wherein the bitmap corresponds to an entirety of a bandwidth of BWP.

In a thirty-second aspect, alone or in combination with one or more of the above aspects, the resource allocation information corresponds to a bitmap for resource element information of an active BWP, wherein the bitmap corresponds to a portion of a bandwidth of the active BWP that overlaps one or more subbands of a slot where the transmission occurs. A subband that corresponds to a BWP or where the transmission occurs may be DL subband for a DL BWP or a DL/UL BWP or may be an UL subband for an UL BWP or DL/UL BWP.

In another aspect, an apparatus includes at least one processor and a memory coupled to the at least one processor. The at least one processor is configured to receive resource allocation information; wherein the resource allocation information is indicated by a field that includes a first set of bits with FDRA information and a second set of bits with non-FDRA information, and wherein a quantity of bits of the first set of bits with the FDRA information corresponds to a transmission bandwidth for a transmission; and communicate with a second network node using the transmission bandwidth for the transmission.

In another aspect, an apparatus includes at least one processor and a memory coupled to the at least one processor. The at least one processor is configured to receive resource allocation information with a quantity of bits that corresponds to a transmission bandwidth for a transmission, wherein the resource allocation information is included in a variable length field; and communicate with a second network node using the transmission bandwidth for the transmission mission Accordingly, wireless communication devices may perform improved frequency domain resource allocation operations for wireless communication devices. By performing improved frequency domain resource allocation, throughput can be increased and latency can be reduced.

Figure 13:
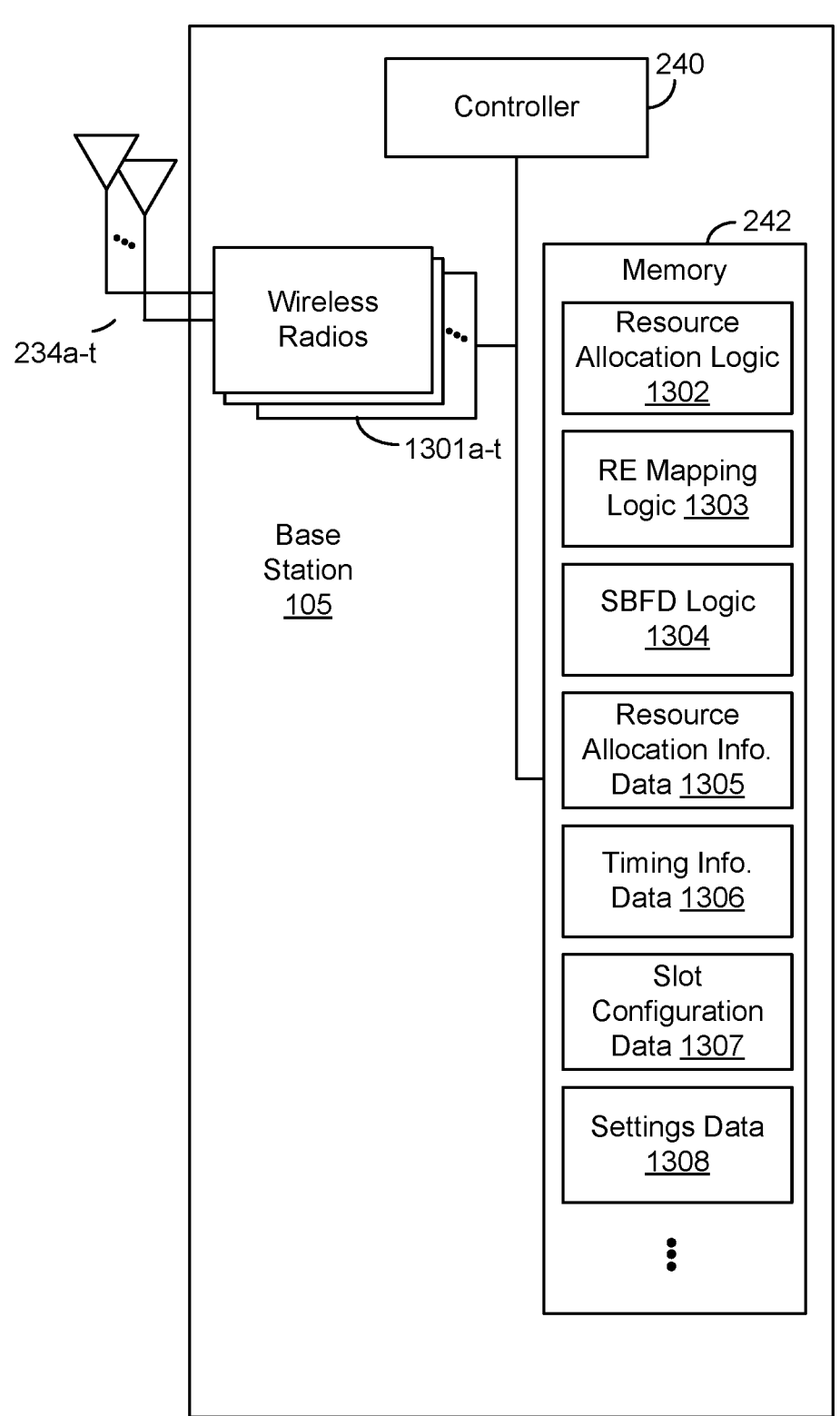
FIG. 13 is a block diagram of an example base station that supports enhanced frequency domain resource allocation according to one or more aspects.

FIG. 11 is a flow diagram illustrating example blocks executed wireless communication device (e.g., a UE or network entity, such as a base station) configured according to an aspect of the present disclosure. The example blocks will also be described with respect to base station 105 as illustrated in FIG. 13. FIG. 13 is a block diagram illustrating base station 105 configured according to one aspect of the present disclosure. Base station 105 includes the structure, hardware, and components as illustrated for base station 105 of FIGS. 2 and/or 4. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1301*a-t* and antennas 234*a-t*. Wireless radios 1301*a-t* includes various components and hardware, as illustrated in FIG. 2 for base station 105, including modulator/demodulators 232*a-r*, MIMO detector 236, receive processor 238, transmit processor 220, and TX MIMO processor 230. As illustrated in the example of FIG. 13, memory 242 stores resource allocation logic 1302, resource element mapping logic 1303, broadcast logic 1304, resource allocation information data 1305, timing information data 1306, slot configuration data 1307, and settings data 1308. The data (1302-1308) stored in the memory 242 may include or correspond to the data (406, 408, 442, and/or 444) stored in the memory 432 of FIG. 4.

At block 1100, a wireless communication device, such as a network device (e.g., a base station 105), transmits resource allocation information including a quantity of bits that corresponds to a transmission bandwidth for a transmission. For example, the base station 105 may transmit the resource allocation information 454 to one or more UEs (e.g., the UE 115 and/or the second UE 403). As described above, the resource allocation information may include or correspond to a bitmap which indicates FDRA information.

The resource allocation information may be transmitted in a transmission or message that includes or include or correspond to the configuration transmission 450 of FIG. 4, the configuration message 452 of FIG. 4, the signaling message of FIG. 4, the DCI of FIG. 5, or the RRC of FIG. 6. To illustrate, a transmitter (e.g., transmit processor 220/TX MIMO processor 230 or transmitter 434) of the base station 105 transmits the resource allocation information 454 via wireless radios 1301*a-t* and antennas 234*a-t*. As other examples, resource allocation information may be transmitted in a transmission or message that includes or include or correspond to the configuration transmissions and/or signaling transmission as described with reference to FIGS. 4-6.

At block 1101, the wireless communication device communicates, based on the quantity of bits, with a second network node using the transmission bandwidth for the transmission. For example, the base station 105 may transmit or receive at least one transmission of the transmissions 456 to one or more UEs (e.g., UE 115 and/or second UE 403). The first transmission may include or correspond to one or more of the transmissions 456 of FIG. 4, or one or more of uplink or downlink transmissions, as described with reference to FIGS. 5 and 6.

When the base station 105 receives the first transmission, the base station 105 may receive, based on the resource allocation information, a downlink transmission or a sidelink transmission. To illustrate, a receiver (e.g., receiver processor 238 or receiver 436) of the base station 105 receives the first transmission 456 via wireless radios 1301*a-t* and antennas 234*a-t* using the transmission bandwidth for the transmission.

When the base station 105 transmits the first transmission, the base station 105 may transmit, based on the resource allocation information, an uplink transmission or a sidelink transmission. To illustrate, a transmitter (e.g., transmit processor 220/TX MIMO processor 230 or transmitter 434) of the base station 105 transmits the first transmission 456 via wireless radios 1301*a-t* and antennas 234*a-t* using the transmission bandwidth for the transmission.

The wireless communication device (e.g., such as a UE or base station) may execute additional blocks (or the wireless communication device may be configured further perform additional operations) in other implementations. For example, the wireless communication device may perform one or more operations as described with reference to FIGS. 4-7. As another example, the wireless communication device may perform one or more aspects as described above with reference to FIG. 12.

Accordingly, wireless communication devices may perform improved frequency domain resource allocation operations for wireless communication devices. By performing improved frequency domain resource allocation, throughput can be increased and latency can be reduced.

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B. Also, as used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently. Also, as used herein, the phrase "a set" shall be construed as including the possibility of a set with one member. That is, the phrase "a set" shall be construed in the same manner as "one or more" or "at least one of."

As used herein, the term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A first network node for wireless communication, comprising:

at least one processor; and a memory coupled to the at least one processor, wherein the at least one processor is configured to:

receive resource allocation information including a quantity of bits that corresponds to a transmission bandwidth for a transmission, wherein the resource allocation information corresponds to a bitmap for resource element information of an active bandwidth part (BWP), wherein the BWP is a downlink (DL) BWP, an uplink (UL) BWP, or an UL/DL BWP, wherein each bit of the bitmap corresponds to a respective resource block group (RBG) of the active BWP, wherein a particular RBG for a particular bit of the bitmap partially overlaps with a transmission band for the transmission, and wherein the particular RBG is not allocated or transmitted; and communicate, based on the quantity of bits, with a second network node using the transmission bandwidth for the transmission.

2. A first network node for wireless communication, comprising:

at least one processor; and a memory coupled to the at least one processor, wherein the at least one processor is configured to:

receive resource allocation information including a quantity of bits that corresponds to a transmission bandwidth for a transmission, wherein the resource allocation information corresponds to a bitmap for resource element information of an active bandwidth part (BWP), wherein the BWP is a downlink (DL) BWP, an uplink (UL) BWP, or an UL/DL BWP, wherein each bit of the bitmap corresponds to a respective RBG of the active BWP, wherein a particular RBG for a particular bit of the bitmap partially overlaps with a transmission band for the transmission, wherein a first portion of the corresponding RBG is allocated and transmitted and a second portion of the corresponding RBG is not allocated or transmitted, and wherein the first portion corresponds to resource blocks of the particular RBG which fully overlap the transmission band; and communicate, based on the quantity of bits, with a second network node using the transmission bandwidth for the transmission.

3. A first network node for wireless communication, comprising:

at least one processor; and a memory coupled to the at least one processor, wherein the at least one processor is configured to:

receive resource allocation information including a quantity of bits that corresponds to a transmission bandwidth for a transmission; and communicate, based on the quantity of bits, with a second network node using the transmission bandwidth for the transmission, wherein the quantity of bits corresponds to a total quantity bits of a frequency domain resource allocation (FDRA) field, and wherein the total quantity of bits is based on:

a quantity of resource block groups that overlap one or more corresponding subbands of a slot of the transmission, and an RBG size.

4. The first network node of claim 3, wherein the RBG size indicates a quantity of RBs in each RBG, and wherein the total quantity of bits in the FDRA field is the quantity of RBGs that at least partially overlap with any of the subbands divided by the quantity of RBs in each RBG.

5. A first network node for wireless communication, comprising:

at least one processor; and a memory coupled to the at least one processor, wherein the at least one processor is configured to:

receive resource allocation information including a quantity of bits that corresponds to a transmission bandwidth for a transmission; anmd communicate, based on the quantity of bits, with a second network node using the transmission bandwidth for the transmission, wherein a band corresponding to the transmission has multiple subbands, wherein a first subband of the multiple subbands has a first RBG size and a second subband of the multiple subbands has a second RBG size different from the first RBG size, and wherein a total number of bits of the transmission is a sum a first quantity of bits that corresponds to a first quantity of RBGs in a BWP overlapping with the first subband divided by the first RBG size of the first subband and of a second quantity of bits that corresponds to a second quantity of RBGs in the BWP overlapping with the second subband divided by the second RBG size of the second subband.

6. A first network node for wireless communication, comprising:

at least one processor; and a memory coupled to the at least one processor, wherein the at least one processor is configured to:

receive resource allocation information including a quantity of bits that corresponds to a transmission bandwidth for a transmission;

receive slot type information and resource element size information;

determine a length of an FDRA field based on the slot type information and the resource element size information, wherein the resource allocation information corresponds to the FDRA field;

determine the transmission bandwidth for the transmission based on the length of the FDRA field; and communicate, based on the quantity of bits, with a second network node using the transmission bandwidth for the transmission.

7. The first network node of claim 6, wherein, to determine the transmission bandwidth based on the length of the FDRA field, the at least one processor is configured to:

determine the transmission bandwidth for the transmission based on a quantity of bits of the FDRA field which have a particular value.

* * * * *